United States Patent
Naka

(10) Patent No.: US 9,288,355 B2
(45) Date of Patent: Mar. 15, 2016

(54) ELECTRONIC DEVICE AND METHOD FOR PRINTING BASED ON INFORMATION WRITTEN BY AN EXTERNAL DEVICE IN A POWER-OFF STATE

(71) Applicant: CANON KABUSHIKI KAISHA, Tokyo (JP)

(72) Inventor: Akiteru Naka, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/299,594

(22) Filed: Jun. 9, 2014

(65) Prior Publication Data

US 2015/0002878 A1 Jan. 1, 2015

(30) Foreign Application Priority Data

Jun. 28, 2013 (JP) ................................. 2013-137471
May 2, 2014 (JP) ................................. 2014-095512

(51) Int. Cl.
*H04N 1/00* (2006.01)

(52) U.S. Cl.
CPC ....... *H04N 1/00891* (2013.01); *H04N 1/00307* (2013.01); *H04N 1/00888* (2013.01); *H04N 2201/0055* (2013.01)

(58) Field of Classification Search
CPC ............. H04W 4/008; H04W 52/0274; H04N 1/00888; H04N 1/00891

USPC ....................... 358/1.14, 1.15; 455/41.1, 41.2
See application file for complete search history.

(56) References Cited

U.S. PATENT DOCUMENTS

| 2011/0292445 A1* | 12/2011 | Kato ............................ 358/1.15 |
| 2012/0164944 A1* | 6/2012 | Yamaoka et al. ............ 455/41.1 |
| 2013/0229684 A1* | 9/2013 | Yasuzaki ..................... 358/1.15 |

FOREIGN PATENT DOCUMENTS

| JP | 2012-42995 A | 3/2012 |
| JP | 2012-100307 A | 5/2012 |

* cited by examiner

*Primary Examiner* — Jacky X Zheng
(74) *Attorney, Agent, or Firm* — Fitzpatrick, Cella, Harper & Scinto

(57) ABSTRACT

An electronic device comprises: a management unit configured to manage device information of the electronic device by storing the device information in a first storage unit; a communication unit configured to communicate with an external device according to short distance wireless communication; a storage control unit configured to control, when the electronic device transits from a power-on state to a power-off state, to write the device information stored in the first storage unit in a second storage unit; and a control unit configured to control, upon receiving a read request or write request of the device information from the external device via the communication unit, to read or write the device information stored in the second storage unit when the electronic device is in the power-off state.

15 Claims, 31 Drawing Sheets

F I G. 5

| ID | NAME | ACCESS RIGHT | AUTOMATIC UPDATE | SIZE | PRIORITY |
|---|---|---|---|---|---|
| 100001 | MAGAZINE (ROLL PAPER) INFORMATION | R/W | NG | 100byte | HIGH |
| 100002 | INK INFORMATION | R | - | 50byte | LOW |
| 100003 | PAPER JAM INFORMATION | R | - | 64byte | MID |
| 100004 | SORTER INFORMATION | R/W | OK | 1000byte | HIGH |
| 100005 | PART A USE COUNT | R/W | NG | 10byte | MID |
| 100006 | PART B USE COUNT | R/W | NG | 10byte | MID |
| 100007 | JOB INFORMATION | R | - | 100byte | LOW |
| 100008 | LICENSE INFORMATION | R/W | OK | 20byte | MID |
| 100009 | SCREEN INFORMATION | R/W | OK | 100byte | LOW |
|  |  |  |  |  |  |

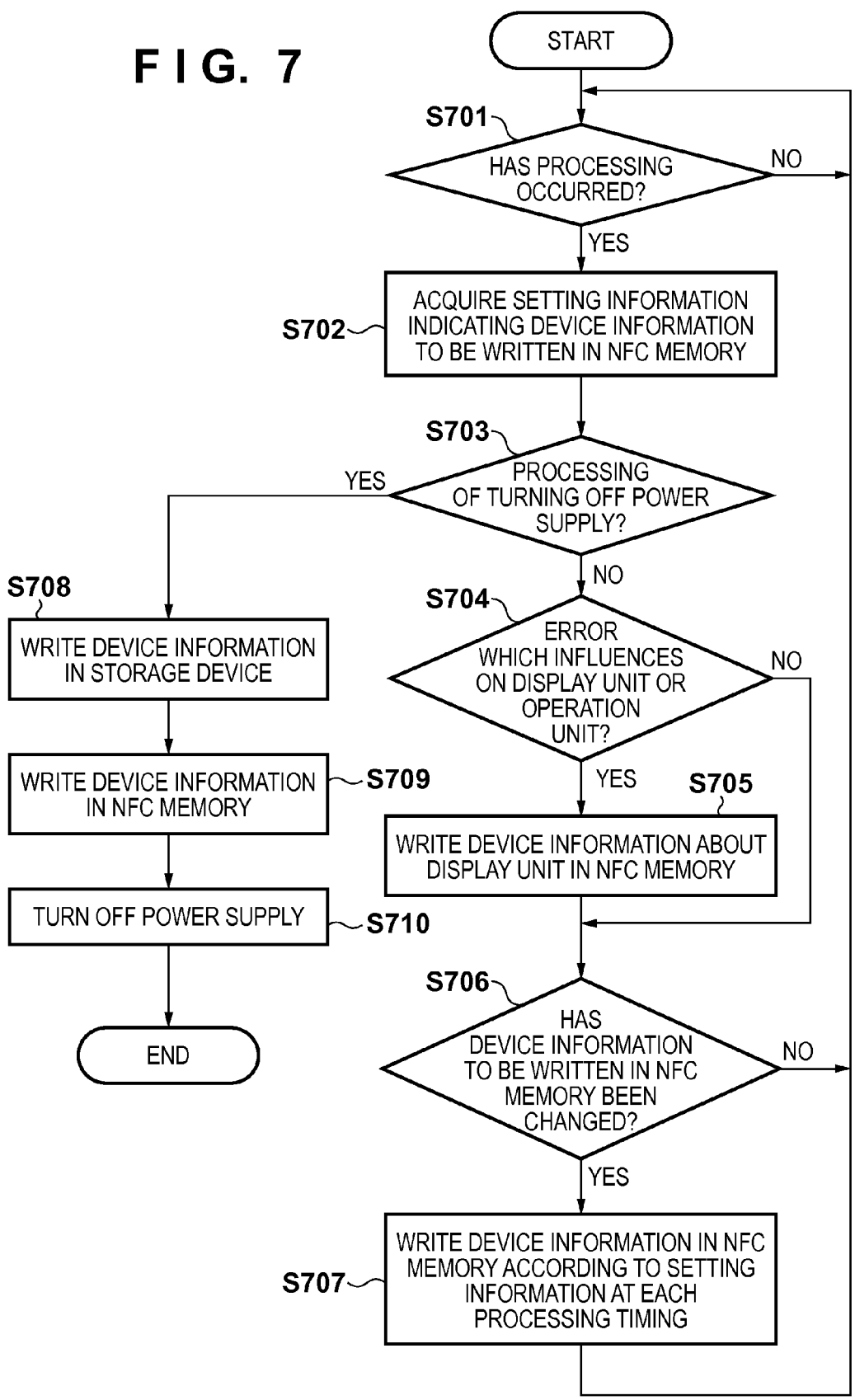

▶MAGAZINE INFORMATION — 802

| MAGAZINE NO | WIDTH(inch) | PAPER TYPE | REMAINING LENGTH(m) |
|---|---|---|---|
| MAGAZINE 1 | 6 | GLOSSY PAPER | 60 |
| MAGAZINE 2 | 11 | SEMI-GLOSSY PAPER | 120 |
| MAGAZINE 3 | 11 | SEMI-GLOSSY PAPER | 20 |
| MAGAZINE 4 | 5 | MAT PAPER | 100 |

▶ INK INFORMATION — 803

| TANK NO | TYPE | REMAINING LENGTH(ml) |
|---|---|---|
| TANK 1 | C | 50 |
| TANK 2 | M | 80 |
| TANK 3 | Y | 20 |
| TANK 4 | K | 90 |

▶ PAPER JAM INFORMATION — 804

| LOCATION | PAPER SHEET INFORMATION | COUNT |
|---|---|---|
| PAPER CONVEYANCE UNIT | 6inch(GLOSSY PAPER) | 2 |
| | 11inch(SEMI-GLOSSY PAPER) | 4 |
| | 11inch(GLOSSY PAPER) | 5 |
| | 5inch(SEMI-GLOSSY PAPER) | 7 |
| TAKE-UP UNIT | 6inch(GLOSSY PAPER) | 1 |
| | 11inch(SEMI-GLOSSY PAPER) | 1 |
| | 11inch(GLOSSY PAPER) | 3 |
| | 5inch(SEMI-GLOSSY PAPER) | 2 |
| CUTTING UNIT | 6inch(GLOSSY PAPER) | 2 |
| | 11inch(SEMI-GLOSSY PAPER) | 2 |
| | 11inch(GLOSSY PAPER) | 1 |
| | 5inch(SEMI-GLOSSY PAPER) | 1 |

F I G. 8B

| ▶ SORTER INFORMATION | | | | | |
|---|---|---|---|---|---|
| SORTER NO | RECEPTION NUMBER | ORDER | NUMBER OF PAPER SHEETS | CONTENTS | |
| SORTER 1 | 130001 | 1/3 | 100 | CATALOG FOR COMPANY A | |
| SORTER 2 | 130001 | 2/3 | 100 | CATALOG FOR COMPANY A | |
| SORTER 3 | 130001 | 3/3 | 20 | CATALOG FOR COMPANY A | |
| SORTER 4 | 130002 | 1/2 | 100 | ALBUM FOR SCHOOL B | |
| SORTER 5 | 130002 | 2/2 | 100 | ALBUM FOR SCHOOL B | |
| SORTER 6 | | | | | |
| SORTER 7 | | | | | |
| SORTER 8 | | | | | |
| SORTER 9 | | | | | |
| SORTER 10 | | | | | |

805 points to SORTER INFORMATION section. 801 labels the overall form.

▶ PART A USE COUNT

| COUNT | LAST USE DATE/TIME |
|---|---|
| 1,000 | 2012/12/18 9:20 |

806

▶ PART B USE COUNT

| COUNT | LAST USE DATE/TIME |
|---|---|
| 1,500 | 2012/12/10 13:15 |

807

▶ JOB INFORMATION

| RECEPTION NUMBER | RESULT | END DATE/TIME |
|---|---|---|
| 125001 | SUCCESS | 2012/12/10 8:50 |
| 125002 | CANCEL | 2012/12/10 8:55 |
| 125003 | RIP ERROR | 2012/12/10 8:59 |
| ... | | |
| 129999 | SUCCESS | 2012/12/18 9:50 |
| 130000 | SUCCESS | 2012/12/18 9:53 |
| 130001 | SUCCESS | 2012/12/18 9:55 |
| 130002 | SUCCESS | 2012/12/18 9:58 |

808

▶ LICENSE INFORMATION

| SOFTWARE NAME | LICENSE |
|---|---|
| IMAGE CORRECTION | BCD098AB902EF78F |

809

▶ SCREEN INFORMATION

| SCREEN NUMBER | STATE |
|---|---|
| ID0023 | LEFT_TAB_SELECT |

902 — ▶MAGAZINE INFORMATION

| MAGAZINE NO | WIDTH(inch) | PAPER TYPE | REMAINING LENGTH(m) |
|---|---|---|---|
| MAGAZINE 1 | 6 | GLOSSY PAPER | 60 |
| MAGAZINE 2 | 11 | SEMI-GLOSSY PAPER | 120 |
| MAGAZINE 3 | 11 | SEMI-GLOSSY PAPER | 20 |
| MAGAZINE 4 | 5 | MAT PAPER | 100 |

903 — ▶SORTER INFORMATION

| SORTER NO | RECEPTION NUMBER | ORDER | NUMBER OF PAPER SHEETS | CONTENTS |
|---|---|---|---|---|
| SORTER 1 | 130001 | 1/3 | 100 | CATALOG FOR COMPANY A |
| SORTER 2 | 130001 | 2/3 | 100 | CATALOG FOR COMPANY A |
| SORTER 3 | 130001 | 3/3 | 20 | CATALOG FOR COMPANY A |
| SORTER 4 | 130002 | 1/2 | 100 | ALBUM FOR SCHOOL B |
| SORTER 5 | 130002 | 2/2 | 100 | ALBUM FOR SCHOOL B |
| SORTER 6 | | | | |
| SORTER 7 | | | | |
| SORTER 8 | | | | |
| SORTER 9 | | | | |
| SORTER 10 | | | | |

904 — ▶PAPER JAM INFORMATION

| PAPER SHEET INFORMATION | COUNT |
|---|---|
| 6inch(GLOSSY PAPER) | 5 |
| 11inch(SEMI-GLOSSY PAPER) | 7 |
| 11inch(GLOSSY PAPER) | 9 |
| 5inch(SEMI-GLOSSY PAPER) | 10 |

1102 — ▶MAGAZINE INFORMATION

| MAGAZINE NO | WIDTH(inch) | PAPER TYPE | REMAINING LENGTH(m) |
|---|---|---|---|
| MAGAZINE 1 | 6 | GLOSSY PAPER | 60 |
| MAGAZINE 2 | 11 | SEMI-GLOSSY PAPER | 120 |
| MAGAZINE 3 | 11 | MAT PAPER | 120 |
| MAGAZINE 4 | 5 | MAT PAPER | 100 |

(MAGAZINE 3 row highlighted — 1105)

1103 — ▶SORTER INFORMATION

| SORTER NO | RECEPTION NUMBER | ORDER | NUMBER OF PAPER SHEETS | CONTENTS |
|---|---|---|---|---|
| SORTER 1 | | | | |
| SORTER 2 | | | | |
| SORTER 3 | | | | |
| SORTER 4 | 130002 | 1/2 | 100 | ALBUM FOR SCHOOL B |
| SORTER 5 | 130002 | 2/2 | 100 | ALBUM FOR SCHOOL B |
| SORTER 6 | | | | |
| SORTER 7 | | | | |
| SORTER 8 | | | | |
| SORTER 9 | | | | |
| SORTER 10 | | | | |

(SORTER 1–3 empty area highlighted — 1106)

1104 — ▶PAPER JAM INFORMATION

| PAPER SHEET INFORMATION | COUNT |
|---|---|
| 6inch(GLOSSY PAPER) | 5 |
| 11inch(SEMI-GLOSSY PAPER) | 7 |
| 11inch(GLOSSY PAPER) | 9 |
| 5inch(SEMI-GLOSSY PAPER) | 10 |

FOLLOWING INFORMATION NEEDS TO BE SELECTED
MAGAZINE 3
☑ 11inch MAT PAPER              120m(new)
☐ 11inch SEMI-GLOSSY PAPER       20m(old)

Close

F I G. 14A

| ▶MAGAZINE INFORMATION | | | REMAINING | |
|---|---|---|---|---|
| MAGAZINE NO | WIDTH(inch) | PAPER TYPE | LENGTH(m) | ~1401 |
| MAGAZINE 1 | 6 | GLOSSY PAPER | 60 | |
| MAGAZINE 2 | 11 | SEMI-GLOSSY PAPER | 120 | |
| MAGAZINE 3 | 11 | MAT PAPER | 120 | ~1402 |
| MAGAZINE 4 | 5 | MAT PAPER | 100 | |

| ▶ INK INFORMATION | | |
|---|---|---|
| TANK NO | TYPE | REMAINING LENGTH(ml) |
| TANK 1 | C | 50 |
| TANK 2 | M | 80 |
| TANK 3 | Y | 20 |
| TANK 4 | K | 90 |

| ▶ PAPER JAM INFORMATION | | |
|---|---|---|
| LOCATION | PAPER SHEET INFORMATION | COUNT |
| PAPER CONVEYANCE UNIT | 6inch(GLOSSY PAPER) | 2 |
| | 11inch(SEMI-GLOSSY PAPER) | 4 |
| | 11inch(GLOSSY PAPER) | 5 |
| | 5inch(SEMI-GLOSSY PAPER) | 7 |
| TAKE-UP UNIT | 6inch(GLOSSY PAPER) | 1 |
| | 11inch(SEMI-GLOSSY PAPER) | 1 |
| | 11inch(GLOSSY PAPER) | 3 |
| | 5inch(SEMI-GLOSSY PAPER) | 2 |
| CUTTING UNIT | 6inch(GLOSSY PAPER) | 2 |
| | 11inch(SEMI-GLOSSY PAPER) | 2 |
| | 11inch(GLOSSY PAPER) | 1 |
| | 5inch(SEMI-GLOSSY PAPER) | 1 |

F I G. 14B

| SORTER INFORMATION | | | | | |
|---|---|---|---|---|---|
| SORTER NO | RECEPTION NUMBER | ORDER | NUMBER OF PAPER SHEETS | CONTENTS | ~1401 |
| SORTER 1 | | | | | ~1403 |
| SORTER 2 | | | | | |
| SORTER 3 | | | | | |
| SORTER 4 | 130002 | 1/2 | 100 | ALBUM FOR SCHOOL B | |
| SORTER 5 | 130002 | 2/2 | 100 | ALBUM FOR SCHOOL B | |
| SORTER 6 | | | | | |
| SORTER 7 | | | | | |
| SORTER 8 | | | | | |
| SORTER 9 | | | | | |
| SORTER 10 | | | | | |

| ▶ PART A USE COUNT | |
|---|---|
| COUNT | LAST USE DATE/TIME |
| 1,000 | 2012/12/18 9:20 |

| ▶ PART B USE COUNT | |
|---|---|
| COUNT | LAST USE DATE/TIME |
| 1,500 | 2012/12/10 13:15 |

| ▶ JOB INFORMATION | | |
|---|---|---|
| RECEPTION NUMBER | RESULT | END DATE/TIME |
| 125001 | SUCCESS | 2012/12/10 8:50 |
| 125002 | CANCEL | 2012/12/10 8:55 |
| 125003 | RIP ERROR | 2012/12/10 8:59 |
| ... | | |
| 129999 | SUCCESS | 2012/12/18 9:50 |
| 130000 | SUCCESS | 2012/12/18 9:53 |
| 130001 | SUCCESS | 2012/12/18 9:55 |
| 130002 | SUCCESS | 2012/12/18 9:58 |

| ▶ LICENSE INFORMATION | |
|---|---|
| SOFTWARE NAME | LICENSE |
| IMAGE CORRECTION | BCD098AB902EF78F |

| ▶ SCREEN INFORMATION | |
|---|---|
| SCREEN NUMBER | STATE |
| ID0023 | LEFT_TAB_SELECT |

F I G. 17

| | | | |
|---|---|---|---|
| 1701 — ▶MAINTENANCE INFORMATION | | | |
| | PART NAME | NECESSITY OF REPLACEMENT | REPLACEMENT PROCEDURE |
| | PART A | URGENT | ○○○△△△□□□ ---1704 |
| | PART B | NO PROBLEM | |
| 1702 — ▶PART A USE COUNT | | | |
| | COUNT | LAST USE DATE/TIME | |
| | 1,000 | 2012/12/18 9:20 | |
| 1703 — ▶PART B USE COUNT | | | |
| | COUNT | LAST USE DATE/TIME | |
| | 1,500 | 2012/12/10 13:15 | |

F I G. 18

| | | |
|---|---|---|
| 1801 | ▶MAINTENANCE INFORMATION | |
| | PART NAME  NECESSITY OF REPLACEMENT  PROCEDURE | |
| | PART A   URGENT→REPLACED   ○○○△△△□□□ | ← 1806 |
| | PART B   NO PROBLEM   CONFIRMATION PROCEDURE ▽▽▽◇◇◇★★☆ | ← 1807 |
| 1802 | ▶PART A USE COUNT | |
| | COUNT  LAST USE DATE/TIME | |
| | 0 | |
| 1803 | ▶PART B USE COUNT | |
| | COUNT  LAST USE DATE/TIME | |
| | 1,500  2012/12/10 13:15 | |
| 1804 | ▶RECEIVED JOB INFORMATION | |
| | RECEPTION DATE/TIME  DETAILS (URL) | |
| | 2012/12/25 8:50   http://aaa.bbb.ccc.com/xxx/yyy/zzz | |
| | 2012/12/25 8:50   http://aaa.bbb.ccc.com/www/vvv/uuu | ← 1808 |
| | 2012/12/25 9:50   http://ddd.eee.fff.com/www/vvv/uuu | |
| | 2012/12/25 9:50   http://ddd.eee.fff.com/abc/def/ghi | |
| 1805 | ▶LICENSE INFORMATION | |
| | SOFTWARE NAME  LICENSE       DATA | |
| | BOX       ZKPEDE98UYXHH   xxxxx | ← 1809 |

FIG. 20

2001 —
PART A HAS BEEN REPLACED
PLEASE CONFIRM DETAILS ACCORDING TO FOLLOWING PROCEDURE
PROCEDURE 1) ▽▽▽
PROCEDURE 2) ◇◇◇
PROCEDURE 3) ☆☆☆
[Close]

FIG. 21

2101 —
PRINT REQUESTS HAVE BEEN RECEIVED DURING POWER-OFF STATE
PRINT REQUESTS ARE BEING PREFERENTIALLY PROCESSED
RECEPTION NUMBERS
130090, 130091, 130092, 130093
[Close]

FIG. 22

2201 —
SOFTWARE HAS BEEN UPDATED
FOLLOWING FUNCTION HAS BEEN ENABLED
• BOX FUNCTION
  PLEASE SELECT BOX TAB FROM MAIN SCREEN
[Close]

FIG. 23

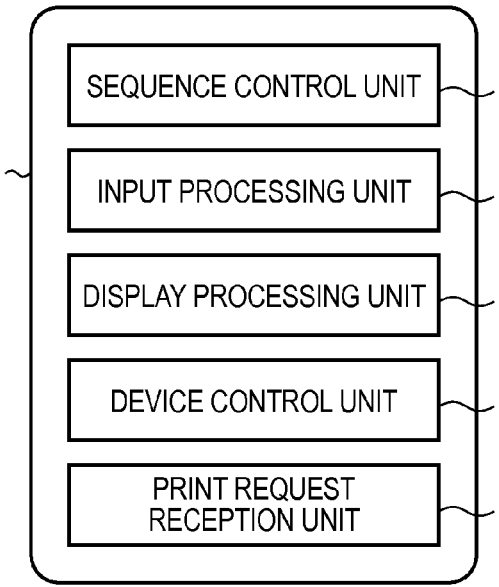

301
- SEQUENCE CONTROL UNIT — 2301
- INPUT PROCESSING UNIT — 2302
- DISPLAY PROCESSING UNIT — 2303
- DEVICE CONTROL UNIT — 2304
- PRINT REQUEST RECEPTION UNIT — 2305

FIG. 24

| STATUS | PRINT DATA | | THUMBNAIL DATA | |
|---|---|---|---|---|
| | NFC MEMORY | NETWORK STORAGE | NFC MEMORY | NETWORK STORAGE |
| PRINT COMPLETION | NOT TO BE HELD | TO BE HELD | NOT TO BE HELD | NOT TO BE HELD |
| PRINT CONTINUATION | TO BE HELD | TO BE HELD | TO BE HELD | NOT TO BE HELD |
| PRINT STANDBY | NOT TO BE HELD | TO BE HELD | TO BE HELD | NOT TO BE HELD |

F I G. 25

PRINT INFORMATION (2501)

| | RECEPTION DATE/TIME | RECEPTION NUMBER | STATUS | END DATA/TIME | PRINT DATA | THUMBNAIL DATA | PRINTING METHOD |
|---|---|---|---|---|---|---|---|
| 2504 | 2014/1/14 8:50 | 000001 | PRINT COMPLETION | 2014/1/14 9:30 | PID_000001 | | |
| 2505 | 2014/1/14 8:50 | 000002 | PRINT COMPLETION | 2014/1/14 9:40 | PID_000002 | | |
| 2506 | 2014/1/14 9:50 | 000003 | PRINT IN PROGRESS | | PID_000003 | SID_000001 | SINGLE-SIDED |
| 2507 | 2014/1/14 9:50 | 000004 | PRINT IN PROGRESS | | PID_000004 | SID_000002 | DOUBLE-SIDED |
| 2508 | 2014/1/14 9:55 | 000005 | PRINT STANDBY | | PID_000005 | SID_000003 | SINGLE-SIDED  2in1 |
| 2509 | 2014/1/14 9:55 | 000006 | PRINT STANDBY | | PID_000006 | SID_000004 | DOUBLE-SIDED SADDLE STITCHING |

PRINT DATA (2502)

| | ID | DATA FORMAT | DATA | |
|---|---|---|---|---|
| 2510 | PID_000001 | REMOTE | http://aaa.bbb.ccc/ddd/eee/f1 | |
|      | PID_000002 | REMOTE | http://aaa.bbb.ccc/ddd/eee/f2 | |
| 2511 | PID_000003 | BOTH   | http://aaa.bbb.ccc/ddd/eee/f3 | xxxxxxxxxxxxxxxxxxxxxxxxxxxxxxxxxxx |
|      | PID_000004 | BOTH   | http://aaa.bbb.ccc/ddd/eee/f4 | xxxxxxxxxxxxxxxxxxxxxxxxxxxxxxxxxxx |
| 2512 | PID_000005 | REMOTE | http://aaa.bbb.ccc/ddd/eee/f5 | |
|      | PID_000006 | REMOTE | http://aaa.bbb.ccc/ddd/eee/f6 | |

THUMBNAIL DATA (2503)

| | ID | DATA FORMAT | DATA |
|---|---|---|---|
| 2513 | SID_000001 | LOCAL  | xxxxxxxxxxxxxxxxxxxxxxxxxxxxxxxxxxx |
|      | SID_000002 | LOCAL  | xxxxxxxxxxxxxxxxxxxxxxxxxxxxxxxxxxx |
| 2514 | SID_000003 | REMOTE | http://aaa.bbb.ccc/ddd/eee/s3 |
|      | SID_000004 | REMOTE | http://aaa.bbb.ccc/ddd/eee/s4 |

PRINT INFORMATION — 2801

| RECEPTION DATE/TIME | RECEPTION NUMBER | STATUS | END DATA/TIME | PRINT DATA | THUMBNAIL DATA | PRINTING METHOD |
|---|---|---|---|---|---|---|
| 2014/1/14 9:50 | 000003 | PRINT IN PROGRESS | | PID_000003 | SID_000001 | SINGLE-SIDED |
| 2014/1/14 9:50 | 000004 | PRINT IN PROGRESS | | PID_000004 | SID_000002 | DOUBLE-SIDED |
| 2014/1/14 9:55 | 000005 | PRINT STANDBY | | PID_000005 | SID_000003 | SINGLE-SIDED 2in1 2 COPIES |
| 2014/1/14 9:55 | 000006 | CANCEL | | PID_000006 | SID_000004 | DOUBLE-SIDED SADDLE STITCHING |

2804, 2805 point to rows 000005 and 000006.

PRINT DATA — 2802

| ID | DATA FORMAT | DATA |
|---|---|---|
| PID_000003 | BOTH | http://aaa.bbb.ccc/ddd/eee/f3 XXXXXXXXXXXXXXXXXXXXXXXXXXXXXXXX |
| PID_000004 | BOTH | http://aaa.bbb.ccc/ddd/eee/f4 XXXXXXXXXXXXXXXXXXXXXXXXXXXXXXXX |
| PID_000005 | REMOTE | http://aaa.bbb.ccc/ddd/eee/f5 |
| PID_000006 | | |

2806 points to PID_000006.

THUMBNAIL DATA — 2803

| ID | DATA FORMAT | DATA |
|---|---|---|
| SID_000001 | LOCAL | XXXXXXXXXXXXXXXXXXXXXXXXXXXXXXXXXXXXX |
| SID_000002 | LOCAL | XXXXXXXXXXXXXXXXXXXXXXXXXXXXXXXXXXXXX |
| SID_000003 | REMOTE | http://aaa.bbb.ccc/ddd/eee/s3 |
| SID_000004 | | |

2807 points to SID_000004.

F I G. 28B

2800b

| 2808 | PRINT INFORMATION | | | | | | |
|---|---|---|---|---|---|---|---|
| | RECEPTION DATE/TIME | RECEPTION NUMBER | STATUS | END DATA/TIME | PRINT DATA | THUMBNAIL DATA | PRINTING METHOD |
| | 2014/1/14 9:50 | 000001 | PRINT IN PROGRESS | | PID_000003 | SID_000001 | SINGLE-SIDED |
| | 2014/1/14 9:50 | 000002 | PRINT IN PROGRESS | | PID_000004 | SID_000002 | DOUBLE-SIDED |
| | 2014/1/14 9:55 | 000003 | PRINT STANDBY | | PID_000005 | SID_000003 | SINGLE-SIDED 2in1 2 COPIES |
| | 2014/1/14 9:55 | 000004 | CANCEL | | PID_000006 | SID_000004 | DOUBLE-SIDED SADDLE STITCHING |
| 2811 | | | NEW | | PID_000007 | SID_000005 | SINGLE-SIDED |
| 2812 | | | NEW | | PID_000008 | SID_000006 | SINGLE-SIDED |

| 2809 | PRINT DATA | | |
|---|---|---|---|
| | ID | DATA FORMAT | DATA |
| | PID_000003 | BOTH | http://aaa.bbb.ccc/ddd/eee/f3 XXXXXXXXXXXXXXXXXXXXXXXXXXXXXX |
| | PID_000004 | BOTH | http://aaa.bbb.ccc/ddd/eee/f4 XXXXXXXXXXXXXXXXXXXXXXXXXXXXXX |
| | PID_000005 | REMOTE | http://aaa.bbb.ccc/ddd/eee/f5 |
| | PID_000006 | | |
| 2813 | PID_000007 | REMOTE | http://aaa.bbb.ccc/ddd/eee/f7 |
| 2814 | PID_000008 | LOCAL | XXXXXXXXXXXXXXXXXXXXXXXXXXXXXXXXXXXX |

| 2810 | THUMBNAIL DATA | | |
|---|---|---|---|
| | ID | DATA FORMAT | DATA |
| | SID_000001 | LOCAL | XXXXXXXXXXXXXXXXXXXXXXXXXXXXXXXXXXXX |
| | SID_000002 | LOCAL | XXXXXXXXXXXXXXXXXXXXXXXXXXXXXXXXXXXX |
| | SID_000003 | REMOTE | http://aaa.bbb.ccc/ddd/eee/s3 |
| | SID_000004 | | |
| 2815 | SID_000005 | | |
| 2816 | SID_000006 | | |

F I G. 29
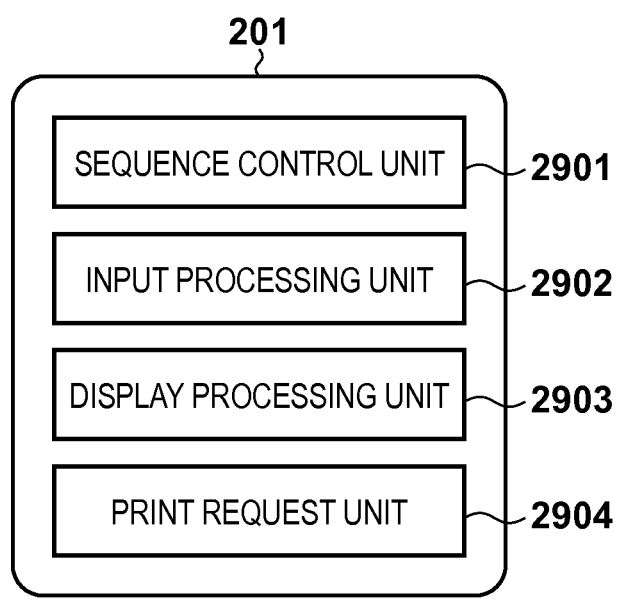

F I G. 32

PRINT REQUESTS HAVE BEEN RECEIVED DURING POWER-OFF STATE
PRINT REQUESTS ARE BEING PREFERENTIALLY PROCESSED
RECEPTION NUMBERS
000007, 000008

CHANGE IN PRINTING METHOD HAS BEEN RECEIVED DURING POWER-OFF STATE
000005   NUMBER OF COPIES   (1→2)

CANCEL REQUEST HAS BEEN RECEIVED DURING POWER-OFF STATE
000006

[Close]

ELECTRONIC DEVICE AND METHOD FOR PRINTING BASED ON INFORMATION WRITTEN BY AN EXTERNAL DEVICE IN A POWER-OFF STATE

BACKGROUND OF THE INVENTION

1. Field of the Invention

The present invention relates to an information processing technique associated with acquisition and setting of device information.

2. Description of the Related Art

To confirm contents (to be referred to as device information hereinafter) set in an MFP (Multi Function Printer), the state of the power supply of the MFP generally needs to be ON. If the state of the power supply of the MFP is OFF, the user turns on the power supply, and waits for initialization of the MFP, thereby confirming the device information on a display screen or via a network. In the case of an MFP used by an individual or in an office, even if the state of the power supply of the MFP is OFF, the user can confirm device information without waiting for a long time after turning on the power supply. In the case of a large-scale MFP used in a factory, however, the user has to wait a long time to confirm device information after turning on the power supply. If, therefore, the state of the power supply is OFF, the user needs to wait a long time to only confirm the type and remaining amount of set paper sheets of the device information. Furthermore, in the case of the large-scale MFP, the amount of power to be consumed is large, and it is thus impractical to turn on the power supply for only confirming the device information when printing is not to be executed.

With respect to not only confirmation of device information but also setting of device information, for example, a paper replacement operation by the user is accompanied by a paper sheet setting operation for an MFP, and thus needs to be done while the power supply is ON. That is, when the power supply of an information processing apparatus is OFF, it is impossible to acquire and set device information.

Only a paper replacement operation can be performed while the power supply is OFF, and a paper sheet setting can be made later to reflect the paper sheet setting, as a matter of course. The user may forget to make a paper sheet setting.

To solve this problem, Japanese Patent Laid-Open No. 2012-100307 (patent literature 1) discloses a unit configured to acquire information using a memory in NFC (Near Field communication) even if the state of a power supply is OFF. Furthermore, Japanese Patent Laid-Open No. 2012-42995 (patent literature 2) discloses a unit configured to set and refer to information using a memory in NFC even if the state of a power supply is OFF.

In patent literatures 1 and 2, however, it is not considered to acquire device information, change contents, and reflect them to the device information when the power supply of an information processing apparatus is in an OFF state. Therefore, if the power supply of an MFP is in an OFF state, it is necessary to cause the power supply to temporarily transit to an ON state.

SUMMARY OF THE INVENTION

According to an aspect of the present invention, an electronic device comprises: a management unit configured to manage device information of the electronic device by storing the device information in a first storage unit; a communication unit configured to communicate with an external device according to short distance wireless communication; a storage control unit configured to control, when the electronic device transits from a power-on state to a power-off state, to write at least part of the device information stored in the first storage unit in a second storage unit different from the first storage unit; and a control unit configured to control, upon receiving a read request or write request of the device information from the external device via the communication unit, to read or write the device information stored in the first storage unit when the electronic device is in the power-on state and to read or write the device information stored in the second storage unit when the electronic device is in the power-off state.

According to the present invention, it is possible to provide a technique which allows acquisition and setting of device information irrespective of the power state of a target device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing an example of setting information of the MFP;

FIG. 7 is a flowchart illustrating processing when the MFP transits to an power-off state;

FIGS. 8A and 8B are views showing an example of device information of the MFP in the power-off state;

FIG. 9 is a view showing an example of device information in an NFC memory in the power-off state;

FIG. 11 is a view showing an example of device information in the NFC memory edited by the smartphone;

FIG. 13 is a view showing an example of the selection screen of the MFP;

FIGS. 14A and 14B are views showing an example when synchronizing the device information of the MFP with that in the NFC memory;

FIG. 17 is a view showing an example of device information in an NFC memory when the maintenance information is written;

FIG. 18 is a view showing an example of the NFC memory edited by a smartphone;

FIG. 20 is a view showing an example of the part replacement screen of the MFP;

FIG. 21 is a view showing an example of the print request reception screen of the MFP;

FIG. 22 is a view showing an example of the software update screen of the MFP;

FIG. 23 is a block diagram showing the schematic arrangement of functions executed by an MFP according to the third embodiment;

FIG. 24 is a table showing print setting information according to the third embodiment;

FIG. 25 is a view showing an example of print information in an NFC memory when print processing is written according to the third embodiment;

FIGS. 28A and 28B are views showing an example of the NFC memory edited by the smartphone according to the third embodiment;

FIG. 29 is a block diagram showing the schematic arrangement of functions executed by the smartphone according to the third embodiment;

FIG. 32 is a view showing an example of the print request reception screen of the MFP according to the third embodiment.

DESCRIPTION OF THE EMBODIMENTS

Preferred embodiments of the present invention will be described in detail below with reference to the accompanying drawings. Note that the following embodiments are merely examples, and do not intend to limit the scope of the present invention.

First Embodiment

As the first embodiment of an electronic device according to the present invention, an MFP for receiving acquisition/setting of device information by a smartphone will be exemplified below.

<Apparatus Arrangement>

Figure 1:
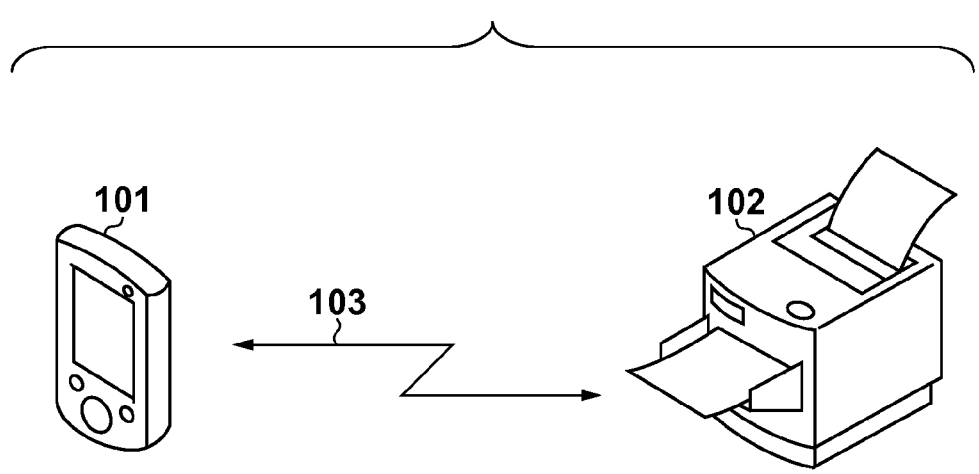
FIG. 1 is a schematic view showing the overall configuration of an information processing system.

FIG. 1 is a schematic view showing the overall configuration of an information processing system according to the first embodiment. This system includes a smartphone 101 as a terminal operated by the user, and an MFP 102 as an electronic device. The terminal can be replaced by a tablet PC or the like other than the smartphone 101. The electronic device is not limited to the MFP 102 and an apparatus such as a projector or personal computer may be used. The smartphone 101 and the MFP 102 are configured to communicate with each other according to predetermined short distance wireless communication. In the first embodiment, a case in which communication complying with the NFC (Near Field Communication) standard is used as predetermined short distance wireless communication will be explained.

Figure 2:
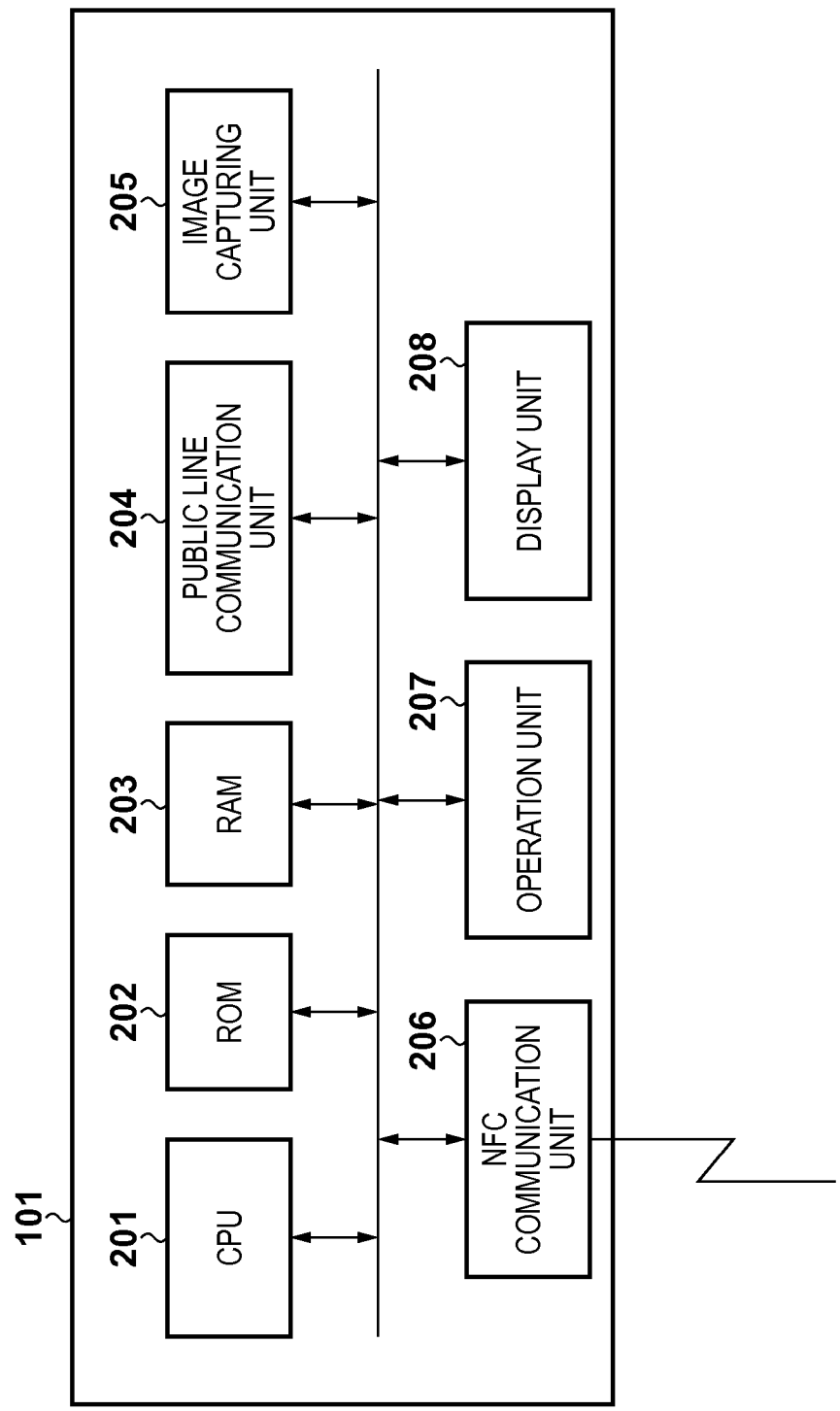
FIG. 2 is a block diagram showing the schematic arrangement of a smartphone.

FIG. 2 is a block diagram showing the schematic arrangement of the smartphone 101. In this example, the smartphone 101 serves as a user interface (UI) device which is used to acquire or set device information of the MFP 102, and operated by the user.

A CPU 201 is a central processing unit for controlling the overall smartphone 101. A display control unit for performing processing for input information received by an operation unit 207 and processing of outputting a display image to a display unit 208 is also implemented by processing of the CPU 201. A ROM 202 stores programs and permanent data, and a RAM 203 is used to temporarily save data and to load programs. A public line communication unit 204 enables the smartphone 101 to connect to another communication apparatus or speech apparatus via a mobile telephone network, and make communication or a call. An image capturing unit 205 includes a photographing lens and image sensor, and captures an object image to form image data.

An NFC communication unit 206 includes an IC chip complying with the NFC communication standard, and performs NFC communication with an external device. The operation unit 207 includes operation buttons and a touch panel, and receives a button operation for the smartphone 101 or a user input through the touch panel. The display unit 208 includes a display for displaying data, and displays UI information including text data and images corresponding to processing contents.

Figure 3:
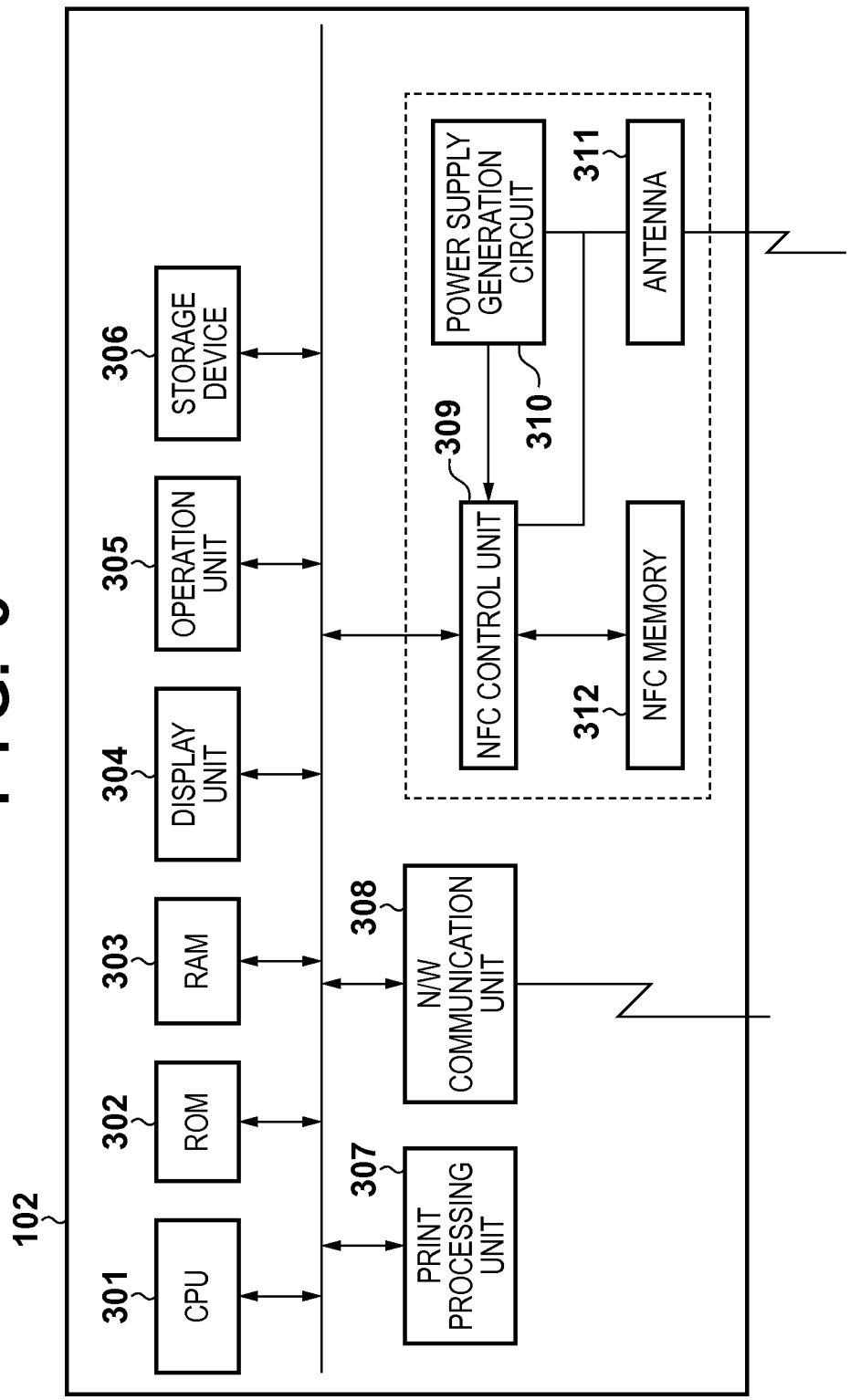
FIG. 3 is a block diagram showing the schematic arrangement of an MFP.

FIG. 3 is a block diagram showing the schematic arrangement of the MFP 102. In this example, the MFP 102 is a device for which device information is acquired or set.

A CPU 301 is a central processing unit for controlling the overall MFP 102, and collectively controls a processing sequence of the MFP 102. A ROM 302 stores programs and permanent data for implementing flowcharts (to be described later), and a RAM 303 is used to temporarily save data and to load programs. A display unit 304 includes a display for displaying data such as an LCD (Liquid Crystal Display), and displays text data and image data corresponding to processing contents of the MFP 102.

An operation unit 305 receives a button operation for the MFP 102 or a user input through a touch panel. A storage device 306 (first storage unit) is a device for saving image data and device information. A print processing unit 307 includes an inkjet printer device or laser printer device, and executes control of the printer device and print processing for image data. After receiving image data from an external device via a network (N/W) communication unit 308, and temporarily saving the image data in the storage device 306, the MFP 102 performs various kinds of processing such as image correction processing for the image data, and causes the print processing unit 307 (a print output unit) to print the image data.

An NFC control unit 309 is formed by an NFC chip and the like, and communicably connects to the smartphone 101 by NFC communication 103 to control data transmission/reception. A power supply generation circuit 310 acquires, via an antenna 311, by electromagnetic induction, power from weak radio waves generated by the NFC control unit 309. When the acquired power exceeds a predetermined value, the NFC control unit 309 exchanges data with the smartphone 101 via the antenna 311, and receives a read request or write request. The exchanged data are read and written from and in a nonvolatile NFC memory 312. That is, an NFC communication unit (a portion surrounded by dotted lines in FIG. 3) can individually operate even if the MFP 102 is in a power-off state.

Both the smartphone 101 and the MFP 102 can read and write data from and in the NFC memory 312 (a second storage unit). If, therefore, the MFP 102 writes some information in the NFC memory 312, the smartphone 101 can read data from the NFC memory 312 even after the overall MFP 102 is powered off.

Figure 4:
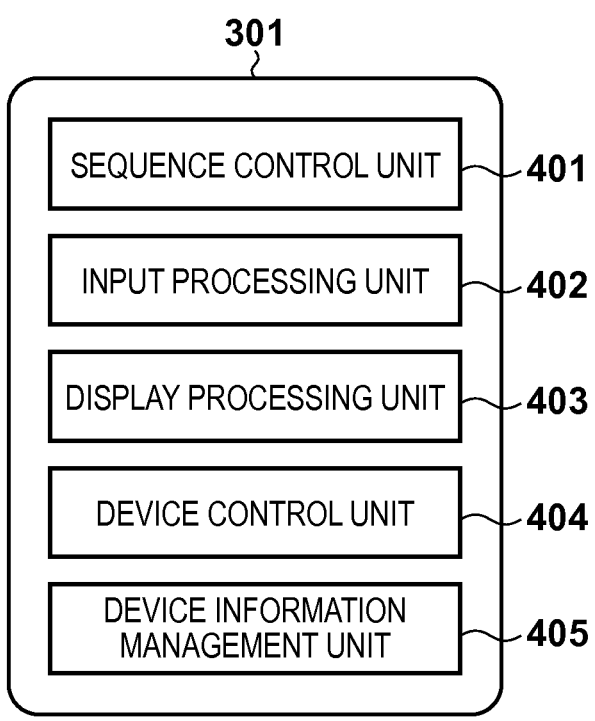
FIG. 4 is a block diagram showing functions executed by the CPU of the MFP according to the first embodiment.

FIG. 4 is a block diagram showing functions executed by the CPU of the MFP according to the first embodiment. Each function unit is implemented when the CPU 301 executes a program stored in the ROM 302. A sequence control unit 401 manages control of the overall device including a power supply, and controls access to the NFC memory 312 via the NFC control unit 309. An input processing unit 402 processes input information received by the operation unit 305. A display processing unit 403 performs processing of outputting a display image to the display unit 304. A device control unit 404 controls the storage device 306 and the print processing unit 307. Furthermore, the device control unit 404 acquires and holds device information about the device such as the number of times a part is used in print processing. A device information management unit 405 manages the device information (available sorter information, information about roll paper used for a magazine, and the like) of the MFP 102.

When the MFP 102 is in a power-on state, the NFC control unit 309 can read and write the device information of the overall MFP 102 by accessing the device information management unit 405 via the sequence control unit 401. An NFC control unit 309 can change an access destination (a reading or writing target) to one of the NFC memory 312 and the device information management unit 405 depending on whether the power supply of the MFP 102 is OFF or ON (a control unit). In this case, determination is made depending on whether the power supply is ON or OFF for the sake of simplicity. However, determination may be made depending on whether the device is in a power saving (sleep) mode. If the device is in the power saving mode, it is possible to access the NFC memory 312. Note that the same applies to a case in which each function of FIG. 4 described above is formed by hardware. For example, the same applies to a case in which the print processing unit is another IC chip operating by connecting to the CPU 301.

FIG. 5 is a table showing an example of setting information 501 of the MFP. The device information management unit 405 analyzes the setting information 501 in which device information to be written in the NFC memory 312 is registered. The setting information 501 is generally saved in the storage device 306, and can be changed by the user via the display unit 304 and the operation unit 305.

One item (one record) of the device information is formed by "ID", "name", "access right", "automatic update", "size", and "priority". Note that "access right" indicates whether only a read operation is possible (to be referred to as "R" hereinafter) or both a read operation and write operation are possible (to be referred to as "R/W" hereinafter) when the smartphone 101 accesses the NFC memory 312. Furthermore, "automatic update" indicates whether to automatically update data when the contents of the NFC memory 312 are changed and, as a result, there is a difference between the device information held in the device and that in the NFC memory 312. In this example, information of "automatic update" is set for only an item of the device information, whose "access right" is "R/W".

"Size" indicates a maximum memory usage necessary for writing the device information in the NFC memory 312. "Priority" indicates an index for specifying an item which is preferentially written in the NFC memory 312 when the upper limit of the available memory size of the NFC memory 312 is exceeded. In FIG. 5, "HIGH" is set for an item having high priority, "MID" is set for an item having middle priority, and "LOW" is set for an item having low priority. However, numbers or evaluation expressions may be used, as a matter of course. For example, if an error occurs in the display unit 304, an item whose "priority" is normally set to "LOW" may be evaluated to set "priority" to "HIGH".

The device information such as the width and type of roll paper stored in the magazine of the MFP 102 is set as magazine (roll paper) information 502, which is analyzed by the device information management unit 405 to indicate that "access right" is "R/W", "automatic update" is "NG", and "priority" is "HIGH".

An ink consumption amount or the like is set as ink information 503 and the number of times a paper jam has occurred is set as paper jam information 504. For these pieces of information, "access right" is "R". This indicates that the smartphone 101 can read out the information but cannot write the information. Furthermore, "priority" of the ink information 503 is set to "LOW" and "priority" of the paper jam information 504 is set to "MID". This indicates that, for example, these pieces of information are not written in the NFC memory 312 depending on the available capacity of the NFC memory 312.

Paper sheets printed by the print processing unit 307 are discharged to a sorter for each print request from the user. Device information indicating a sorter to which paper sheets for each print request have been discharged is set as sorter information 505. In this example, "priority" of the sorter information 505 is set to "HIGH" since if the power supply of the MFP 102 is turned off while discharged paper sheets remain on a sorter, it becomes impossible to recognize a print request corresponding to the discharged paper sheets. With respect to matching for a print request and paper sheets discharged to a sorter, it is possible to acquire, via the smartphone 101, the contents written in the NFC memory 312 even if the power supply of the MFP 102 is OFF.

With respect to consumable parts, their use counts are set as a part A use count 506 and part B use count 507, and written and set in the NFC memory 312. In this example, "access right" of each of the pieces of information is set to "R/W". This is because a use case is considered in which when replacing each part in the power-off state, its use count is set to "0" using the smartphone 101.

The history of print requests issued by the MFP 102 can be set as job information 508 and, for example, several recent requests are written in the NFC memory 312. This enables the smartphone 101 to acquire the history even if the power supply of the MFP 102 is OFF.

A license may be required to enable a function in the MFP 102. In this case, license information 509 is set. In this example, a use case is considered in which enabling/disabling of a license is set via the smartphone 101 while the power supply of the MFP 102 is OFF.

Screen information 510 is set by considering a use case in which screen information displayed last before the power supply of the MFP 102 is turned off is stored. Similarly, error screen information may be stored.

<Operation of Apparatus>

Figure 6:
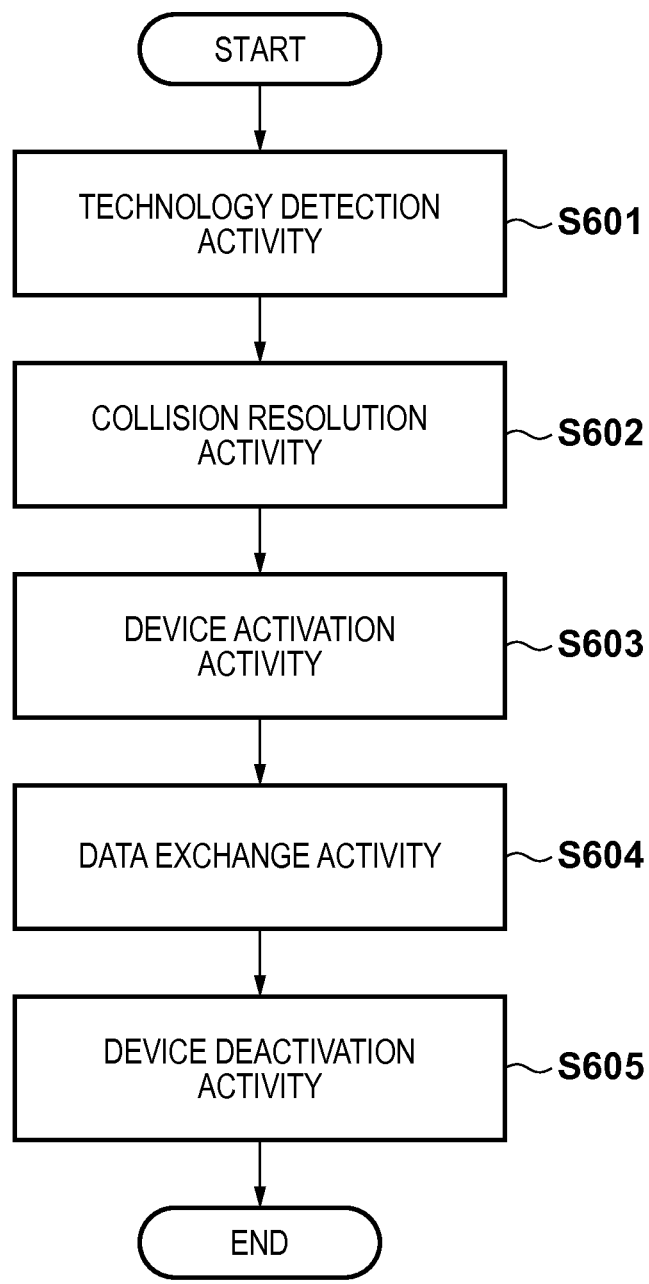
FIG. 6 is a flowchart illustrating processing of NFC activities.

FIG. 6 is a flowchart illustrating processing of NFC activities. In NFC communication processing, an NFC device implements detection of a communication partner, communication establishment, and data transmission/reception by performing a series of processes called activities. The NFC device includes an NFC chip. In each activity, a plurality of NFC devices transmit and receive commands to and from each other, thereby performing communication establishment, data exchange, and termination processing. Activity transition will be described below.

In a technology detection activity (step S601), the NFC device detects whether another NFC device exists within a communication range. If another NFC device is found, the NFC device determines the NFC type of the opposite NFC device by transmitting and receiving commands. In a collision resolution activity (step S602), if a plurality of NFC devices are detected, they are identified. In a device activation activity (step S603), the NFC device determines a mode such as a P2P (Peer to Peer) mode or a CE (Card Emulator) mode with which the detected opposite device complies. Alternatively, the NFC device determines a type with which an NFC card complies.

The P2P mode is a mode in which two NFC devices which communicate with each other can transmit and receive arbitrary data in two ways by operating in the P2P mode. The NFC device can transit to the CE mode in which it is possible to make access from the NFC card reader/writer by behaving like an NFC card and the R/W (Reader/Writer) mode in which the NFC device reads and writes data from and in the NFC card, in addition to the P2P mode.

The NFC card is an IC card for which the NFC card reader/writer can perform a read operation and a write operation, and operates by acquiring power from weak radio waves by electromagnetic induction.

In the first embodiment, the MFP 102 can operate at least in the CE mode, and the smartphone 101 can operate in the R/W mode to exchange data with the MFP 102 by the NFC communication 103. In a data exchange activity (step S604), the NFC device transmits and receives data to and from the detected opposite device. In this activity, the NFC device can transmit and receive arbitrary data to and from the opposite device. In a device deactivation activity (step S605), the NFC device performs communication termination processing. The NFC standard defines a communication mode, as a Poll mode, in which commands are actively transmitted by the series of processes in steps S601 to S605. In this example, a case in which the smartphone 101 establishes a connection in the Poll mode will be described. With the series of activity processes described above, NFC communication connection establishment and data transmission/reception are performed when the NFC communication unit 206 of the smartphone 101 and the antenna 311 of the MFP 102 are moved close to each other.

In the first embodiment, a mode will be explained in which the device information of the MFP 102 is acquired using the smartphone 101 while the MFP 102 is in the power-off state. A method of automatically reflecting, upon activation, the state of the device which has been changed in the power-off state will also be described together. A sequence in which the MFP 102 transits from the power-on state to the power-off state and a sequence in which the MFP 102 transits from the power-off state to the power-on state will be described in the order named.

FIG. 7 is a flowchart illustrating processing when the MFP 102 transits to the power-off state.

In step S701, the sequence control unit 401 performs processing of standing by for some processing to occur in the input processing unit 402, the display processing unit 403, or the device control unit 404 in the power-on state. When an event such as a print processing event, paper jam event, or power-off event occurs, the process advances to step S702.

In step S702, the sequence control unit 401 instructs the device information management unit 405 to acquire the setting information 501. Furthermore, the device information management unit 405 performs processing of analyzing the setting information 501, and acquiring, from the device information, a list of parameters (items) to be written in the NFC memory 312. The device information management unit 405 makes an update notification setting for the sequence control unit 401, the input processing unit 402, the display processing unit 403, and the device control unit 404 so that an update notification is sent to the device information management unit 405 when the device information is updated in subsequent processing.

In step S703, the sequence control unit 401 performs processing of determining whether the event is an event to power off the MFP 102. If it is determined that the event is an event to power off the MFP 102 (YES in step S703), the process advances to step S708. On the other hand, if it is determined that the event is not an event to power off the MFP 102 (NO in step S703), the process advances to step S704.

In step S704, the sequence control unit 401 performs processing of determining whether the event is error processing about the input processing unit 402 or the display processing unit 403. If it is determined that the event is error processing about the input processing unit 402 or the display processing unit 403 (YES in step S704), the process advances to step S705. If the event is not error processing (NO in step S704), the process skips step S705 to advance to step S706. In step S705, the sequence control unit 401 performs processing of acquiring error-related device information from the device information management unit 405, and writes the information in the NFC memory 312.

In step S706, the device information management unit 405 performs processing of determining whether the device information to be written in the NFC memory 312 has been changed. If it is determined that the device information to be written in the NFC memory 312 has been changed (YES in step S706), the process advances to step S707. On the other hand, if it is determined that the device information to be written in the NFC memory 312 has not been changed (NO in step S706), the process returns to step S701. In step S707, the sequence control unit 401 performs processing of acquiring device information from the device information management unit 405, and writing the device information in the NFC memory 312. At this time, if the area of the NFC memory 312 is not enough, an item to be written is selected according to its priority.

The sequence control unit 401 repeatedly executes steps S701 to S707 until a power-off event occurs.

In step S708, the sequence control unit 401 performs processing of acquiring the device information from the device information management unit 405, and writing the device information in the storage device 306. In step S709, the sequence control unit 401 performs processing of acquiring a set of pieces of device information to be written in the NFC memory 312 from the device information management unit 405, and writing the set of pieces of device information in the NFC memory 312 (a storage control unit). In step S710, the sequence control unit 401 turns off the power supply, thereby terminating the process.

FIGS. 8A and 8B are a view showing an example of device information 801 of the MFP in the power-off state. That is, FIGS. 8A and 8B show the device information 801 held in the device information management unit 405 when the sequence control unit 401 receives power-off processing. The device information 801 includes, for example, function setting information, operation history information, and consumable item state information.

The device information management unit 405 generates and manages the device information 801 by analyzing the setting information 501 in step S702, and receiving an update notification from each of the sequence control unit 401, the input processing unit 402, the display processing unit 403, and the device control unit 404.

The device information 801 is formed from magazine information 802, ink information 803, paper jam information

804, sorter information 805, a part A use count 806, a part B use count 807, job information 808, license information 809, and screen information 810.

The magazine information 802 indicates that a magazine 1 stores glossy roll paper having a width of 6 inches and a remaining length of 60 m. The ink information 803 indicates that the remaining amount of C (cyan) of a tank 1 is 50 ml. The paper jam information 804 indicates that a paper jam has occurred twice in a paper conveyance unit while printing glossy paper having a width of 6 inches. Similarly, the paper jam information 804 indicates that a paper jam has occurred once in a take-up unit and twice in a cutting unit while printing glossy paper having a width of 6 inches. That is, it is indicated that a paper jam has occurred five times in total for glossy paper having a width of 6 inches.

The sorter information 805 represents that the contents of a print request having a reception number of 130001 indicate a catalog for a company A, and 100 paper sheets, 100 paper sheets, and 20 paper sheets have been discharged to sorters 1, 2, and 3, respectively. The part A use count 806 indicates that the use count of a part A is 1,000, and the last use date/time of the part A is 2012/12/18 09:20. The part B use count 807 indicates that the use count of a part B is 1,500, and the last use date/time of the part B is 2012/12/10 13:15.

The job information 808 indicates that a print request having a reception number of 125001 has succeeded, and its end date/time is 2012/12/10 08:50. The license information 809 indicates that the license key of an image correction function has already been set. The screen information 810 indicates a screen ID of ID0023 and a LEFT_TAB_SELECT state within a screen as information about a screen displayed last.

In step S708, the sequence control unit 401 acquires the above-described device information from the device information management unit 405, and writes it in the storage device.

FIG. 9 is a view showing an example of device information 901 in the NFC memory in the power-off state. That is, FIG. 9 shows the device information 901 written in the NFC memory 312 in step S709.

The sequence control unit 401 repeats processing of acquiring one of the pieces of information included in the device information 801 from the device information management unit 405 and writing the acquired information in the NFC memory 312 until the capacity of the NFC memory runs out or a capacity set in advance is reached. The device information management unit 405 determines the order of items to be written in the NFC memory 312 in accordance with the state of the device or the priorities of the pieces of setting information. For example, items are written from an item with relatively high priority.

Assume that the capacity runs out when the sequence control unit 401 acquires magazine information 902, sorter information 903, and paper jam information 904 from the device information management unit 405 and writes them in the NFC memory 312. Therefore, write processing is terminated midway. If, however, the NFC memory 312 has a sufficient capacity, all or some of the items may be written.

The magazine information 902 and the sorter information 903 are the same as the device information 801 of FIG. 8A. On the other hand, the paper jam information 904 is not the same as the paper jam information 804 of FIG. 8A, and is a subset of the paper jam information 804. More specifically, the total of "counts" for each type of "sheet information" of the paper jam information is calculated and written. Assume that the device information management unit 405 has converted the paper jam information 804 into a necessary and sufficient information amount according to a purpose.

The sequence control unit 401 can provide the device information 901 of the MFP 102 via the smartphone 101 even in the power-off state by writing at least part of the device information 801 in the NFC memory 312 in step S709.

Figure 10:
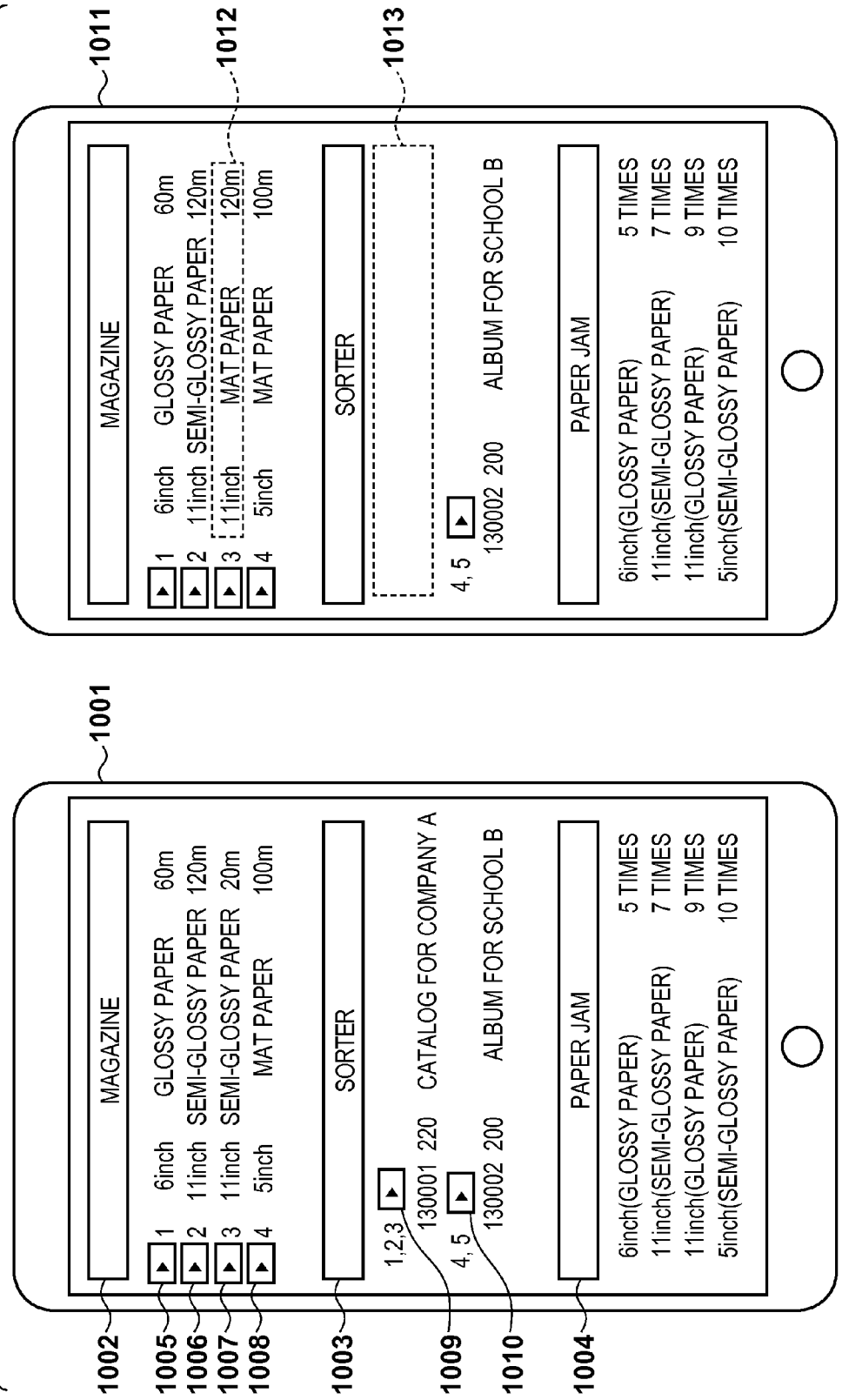
FIG. 10 is a view showing an example of the screen of the smartphone.

FIG. 10 is a view showing an example of the screen of the smartphone. A UI screen 1001 is a screen when the smartphone 101 acquires the device information 901 from the MFP 102 in the power-off state.

The UI screen 1001 includes magazine information 1002, sorter information 1003, and paper jam information 1004. The smartphone 101 can edit the magazine information 1002 by pressing each of magazine edit buttons 1005 to 1008, and write data in the NFC memory 312 of the MFP 102 via the NFC communication 103 after editing. Similarly, the smartphone 101 can edit the sorter information 1003 by pressing each of sorter edit buttons 1009 and 1010.

A UI screen 1011 is the screen of the smartphone 101 when the magazine information is edited by pressing the magazine edit button 1007 of the UI screen 1001, and the sorter information 1003 is edited by pressing the sorter edit button 1009.

In the UI screen 1011, magazine information 1012 of the third magazine is obtained by changing the settings to "mat paper (120 m) having a roll paper width of 11 inches" by the smartphone 101. This information is used to set, in the MFP 102 by performing synchronization, information indicating that paper in the third magazine has been replaced by mat paper (120 m) having a roll paper width of 11 inches during the power-off state of the MFP 102. A blank 1013 has been set when the smartphone 101 deletes the pieces of sorter information for the first to third sorters. The blank is used to set, in the MFP 102 by performing synchronization, information indicating that the catalog for the company A discharged to the first to third sorters has been removed during the power-off state of the MFP 102.

The smartphone 101 writes the changed device information in the NFC memory 312 via the NFC communication 103. With this processing, if the contents of the NFC memory 312 are changed, the MFP 102 can reflect, upon power-on, the changed contents by synchronizing the device information in itself with the changed contents.

FIG. 11 is a view showing an example of device information 1101 in the NFC memory edited by the smartphone. The device information 1101 includes magazine information 1102, sorter information 1103, and paper jam information 1104, similarly to the device information 901 before editing, but portions of magazine information 1105 and a blank 1106 in which the information about the first to third sorters existed have been updated. As described above, the magazine information 1105 indicates that the paper has been changed to the 11-inch mat paper (120 m). The pieces of information have been deleted, which indicates that no paper sheets are placed on the first to third sorters.

Figure 12:
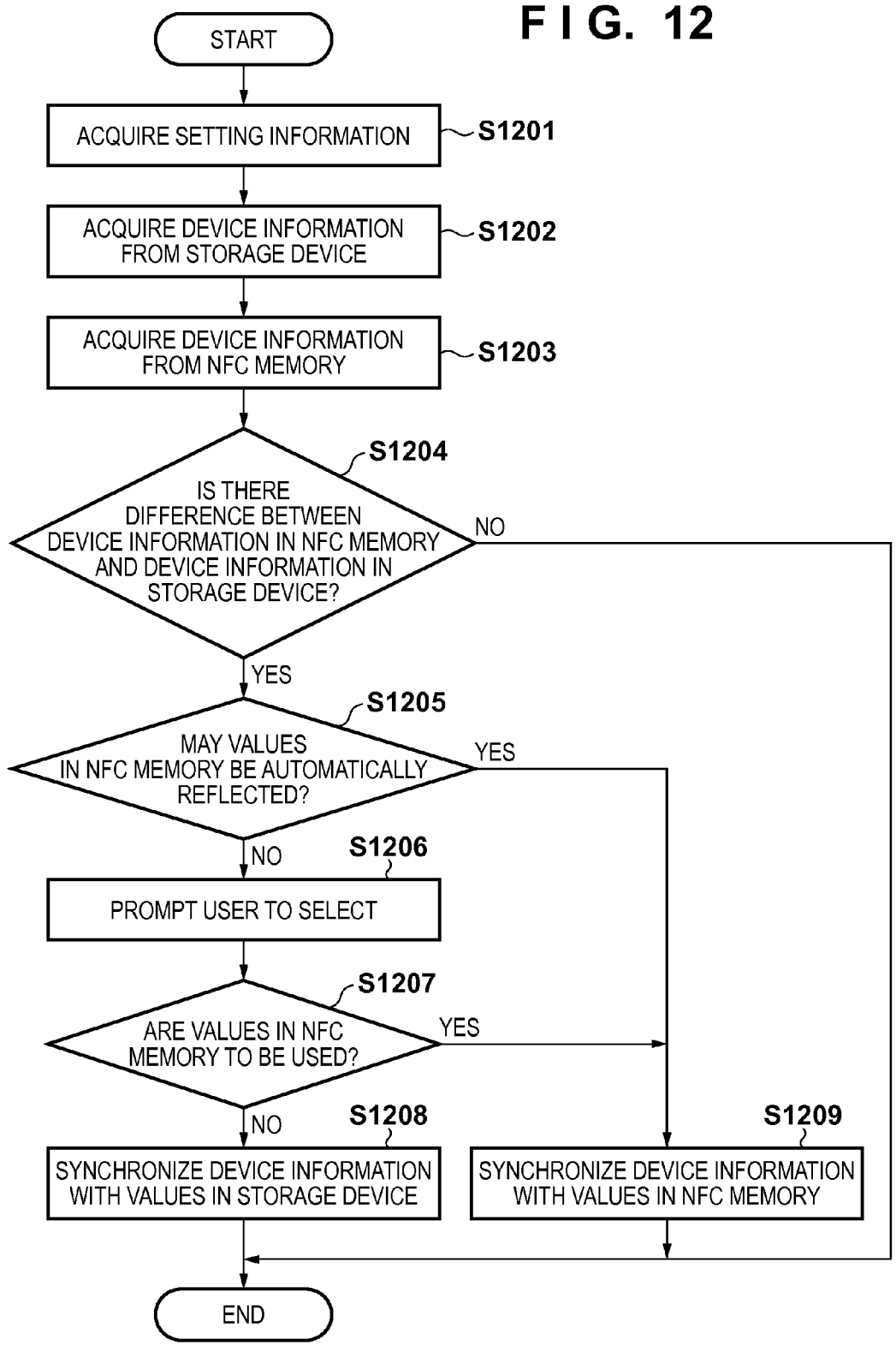
FIG. 12 is a flowchart illustrating processing when the MFP transits to a power-on state.

FIG. 12 is a flowchart illustrating processing when the MFP transits to the power-on state. A case will be explained in which the smartphone 101 has changed the device information 901 held in the NFC memory 312 to the device information 1101 during the power-off state of the MFP 102.

When the MFP transits to the power-on state, in step S1201 the device information management unit 405 analyzes the setting information 501, and acquires automatic update conditions among others. In step S1202, the device information management unit 405 performs processing of acquiring the device information 801 in the MFP 102. In step S1203, the device information management unit 405 performs processing of acquiring the device information 1101 held in the NFC memory 312.

In step S1204, the device information management unit 405 performs processing of determining whether there is a difference between the device information 801 acquired in step S1202 and the device information 1101 acquired in step S1203. If it is determined that there is no difference (NO in step S1204), the process ends. On the other hand, if it is determined that there is a difference (YES in step S1204), the process advances to step S1205.

In step S1205, the device information management unit 405 performs processing of determining based on the values of the device information 1101 in the NFC memory 312 whether to automatically update the device information 801 in the MFP 102. If it is determined to automatically update the device information 801 (YES in step S1205), the process advances to step S1209. On the other hand, if it is determined not to automatically update the device information 801 (NO in step S1205), the process advances to step S1206.

In step S1209, the device information management unit 405 performs processing of synchronizing the device information 801 in the MFP 102 with the values of the device information 1101 in the NFC memory 312. For example, since "automatic update" of the sorter information 505 of the setting information 501 is "OK", the device information management unit 405 overwrites and synchronizes the sorter information 805 of the MFP 102 with the values of the sorter information 1103 in the NFC memory 312.

In step S1206, the display processing unit 403 performs processing of prompting the user to select whether to use the device information 801 in the MFP 102 or the device information 1101 in the NFC memory 312. That is, the display processing unit 403 receives information indicating whether to permit update of the device information 801 in the MFP 102 with the device information 1101 in the NFC memory 312.

FIG. 13 is a view showing an example of the selection screen of the MFP. More specifically, FIG. 13 shows an example of a selection screen 1301 displayed to the user by the display processing unit 403. Since "automatic update" of the magazine (roll paper) information 502 of the setting information 501 is "NG", the device information management unit 405 notifies the display processing unit 403 that the selection screen 1301 for the magazine (roll paper) information 502 is required. The device information management unit 405 also notifies the display processing unit 403 of parameters necessary for the selection screen 1301 since there is a difference in the third magazine information 1102 in the NFC memory 312. When the display processing unit 403 displays the selection screen 1301, the input processing unit 402 receives a user input, and notifies the device information management unit 405 of the result of the user input. The selection screen 1301 may display information indicating who has performed update processing. Furthermore, if a plurality of update records exist for the same item in the NFC memory 312, the selection screen 1301 may display information for each update operation instead of displaying only the latest information.

In step S1207, the device information management unit 405 performs processing of receiving the result of step S1206 from the input processing unit 402, and determining whether to use the values of the device information 1101 in the NFC memory 312. If it is determined not to use the values of the device information 1101 in the NFC memory 312 (NO in step S1207), the process advances to step S1208. On the other hand, it is determined to use the values of the device information 1101 in the NFC memory 312 (YES in step S1207), the process advances to step S1209.

In step S1208, the device information management unit 405 performs processing of overwriting and synchronizing the device information 1101 in the NFC memory 312 with the values of the device information 801 in the MFP 102. In step S1209, the device information management unit 405 overwrites and synchronizes the device information 801 in the MFP 102 with the values of the device information 1101 in the NFC memory 312.

After each step described above is executed, and then synchronization processing ends, the process also ends. Note that the processing order according to the above-described flowchart is not limited to the above-described example. Furthermore, a plurality of processes can be integrated into one process or one process can be divided into a plurality of processes. It is also possible to combine and use further processes in addition to the above-described processes.

FIGS. 14A and 14B are a view showing a case in which the device information in the MFP is synchronized with that in the NFC memory. More specifically, FIGS. 14A and 14B show device information 1401 of the MFP 102 when the sequence shown in FIG. 12 has been performed and synchronization with the device information 1101 in the NFC memory 312 is complete.

The device information management unit 405 has synchronized third magazine information 1402 with the values of the third magazine information 1105 in the NFC memory 312. The device information management unit 405 has also synchronized information 1403 about the first to third sorters with the values of the information about the first to third sorters in the NFC memory 312. As described above, even if the MFP 102 is in the power-off state, the sequence of FIG. 12 correctly updates the device information 1401 in the MFP 102 upon power-on.

As described above, according to the first embodiment, even if the MFP 102 is in the power-off state, it is possible to preferably confirm the device information and change the settings of the device information.

For example, when transiting from the power-on state to the power-off state, the MFP 102 writes the device information 801 in the NFC memory 312. This allows the user to confirm the device information 1101 of the MFP 102 via the smartphone 101 even if the MFP 102 is in the power-off state. Therefore, the user can recognize a print request corresponding to paper sheets discharged to a sorter without waiting for the MFP to be powered on.

Furthermore, for example, when transiting from the power-off state to the power-on state, the MFP 102 synchronizes the device information 1101 in the NFC memory 312 with the device information 801 in the MFP 102. This allows the user to update the device information 801 via the smartphone 101 as if the MFP 102 were in the power-on state, even if the MFP 102 is in the power-off state. Therefore, the user can replace and set roll paper while the MFP 102 is in the power-off state. As a result, the MFP 102 need not be powered on for setting, thereby reducing the power consumption. Furthermore, it is possible to prevent the user from forgetting to set the device information when roll paper is replaced during the power-off state of the MFP 102.

Second Embodiment

In the second embodiment, especially a case in which while an MFP is in the power-off state, maintenance of the MFP is performed via a smartphone and a print request is sent to the MFP via the smartphone will be described.

Figure 15:
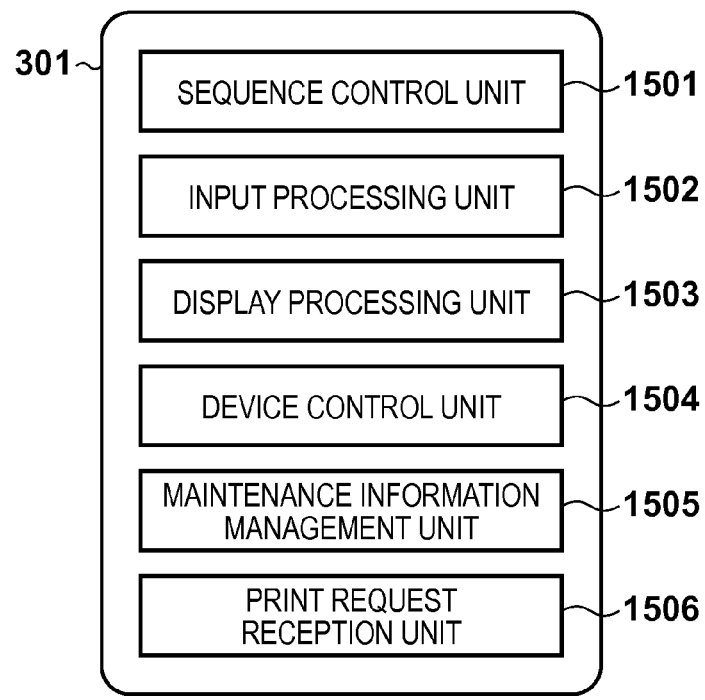
FIG. 15 is a block diagram showing functions executed by the CPU of an MFP according to the second embodiment.

FIG. 15 is a block diagram showing functions executed by the CPU of an MFP according to the second embodiment.

Each function unit is implemented when a CPU 301 executes a program stored in a ROM 302.

A sequence control unit 1501 manages control of the overall device including a power supply, and controls access to an NFC memory 312 via an NFC control unit 309. An input processing unit 1502 processes input information received by an operation unit 305. A display processing unit 1503 performs processing of outputting a display image to a display unit 304. A device control unit 1504 controls a print processing unit 307 and a storage device 306. Furthermore, the device control unit 1504 acquires and holds device information about the device such as the number of times a part is used in print processing. A maintenance information management unit 1505 manages information (hardware and software) pertaining to maintenance of an MFP 102. A print request reception unit 1506 temporarily receives, via an N/W communication unit 308, print data to be processed by the print processing unit 307, and controls a processing order.

Figure 16:
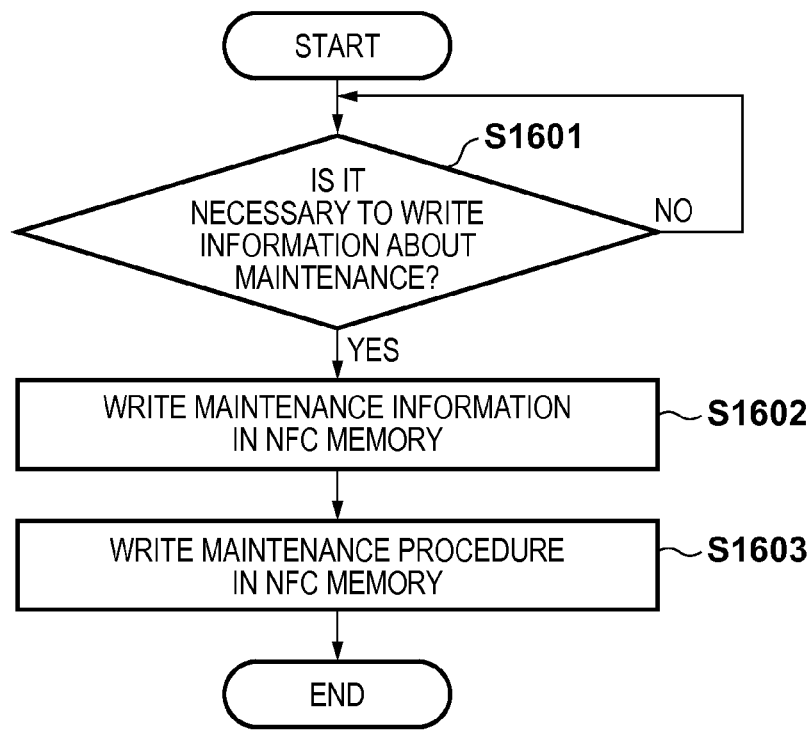
FIG. 16 is a flowchart illustrating processing in which the MFP writes maintenance information.

FIG. 16 is a flowchart illustrating processing in which the MFP writes maintenance information. That is, FIG. 16 shows a sequence of writing maintenance information in the NFC memory 312 while the MFP 102 is in the power-on state.

In step S1601, the sequence control unit 1501 stands by until it becomes necessary to write maintenance information in the power-on state. More specifically, the device control unit 1504 stands by for an increase in use count of a consumable part forming the MFP 102, or detection of an error such as a failure. If it becomes necessary to write maintenance information (YES in step S1601), the process advances to step S1602. In step S1602, the maintenance information management unit 1505 performs processing of writing the maintenance information in the NFC memory 312.

In step S1603, the maintenance information management unit 1505 performs processing of writing, in the NFC memory 312, a procedure of, for example, part replacement by the user or serviceman who maintains the MFP 102. This processing is executed when, for example, the maintenance information management unit 1505 determines based on the use count of a part that replacement of the part is highly necessary.

Upon completion of writing of the maintenance information in the NFC memory 312 through the above steps, the sequence control unit 1501 terminates the sequence.

FIG. 17 is a view showing an example of the device information in the NFC memory when the maintenance information is written. More specifically, FIG. 17 shows maintenance information 1701, part A use count 1702, and part B use count 1703, which have been written in the NFC memory 312 in steps S1602 and S1603.

The maintenance information 1701 indicates that the necessity of replacement of a part B is "no problem" while the necessity of replacement of a part A is "urgent". As indicated by contents 1704, the replacement procedure of the part A is "○○○△△△□□□". The contents 1704 are obtained when the maintenance information management unit 1505 performs determination based on the usable count of the part A and the actual use count of the part A, and calculates the necessity of replacement, thereby writing the result in the NFC memory 312 in step S1603 described above. The maintenance information management unit 1505 also determines whether to describe the replacement procedure.

For example, the serviceman or user can recognize a procedure of replacing the part A by reading out and displaying, using a smartphone 101, the replacement procedure information written in the NFC memory 312.

The part A use count 1702 indicates that the use count of the part A is "1,000" and the last use date/time of the part A is "2012/12/18 09:20". Furthermore, the part B use count 1703 indicates that the use count of the part B is "1,500" and the last use date/time is "2012/12/10 13:15".

FIG. 18 is a view showing an example of the information in the NFC memory edited by the smartphone. More specifically, FIG. 18 shows a state after the part A is replaced and the smartphone 101 is used to send a print request and register a license while the MFP 102 is in the power-off state. Especially, FIG. 18 shows information obtained by updating the information in the NFC memory 312 of FIG. 17. In this example, the information in the NFC memory 312 includes maintenance information 1801, part A use count 1802, part B use count 1803, received job information 1804, and license information 1805.

In the maintenance information 1801, the necessity of replacement of the part A in contents 1806 has been changed from "urgent" to "replaced", which indicates that the serviceman has replaced the part A. The part A use count 1802 indicates that the part A has been replaced and its use count has been reset to "0", and a confirmation procedure 1807 for confirming details in the MFP 102 has been appended. That is, the smartphone 101 also writes the procedure of confirming detailed information about replacement of the part A in the NFC memory 312.

The received job information 1804 indicates a state in which request contents are written in the NFC memory 312 as a result of sending print requests via the smartphone 101 while the MFP 102 is in the power-off state. Received print requests are written in the NFC memory 312 as received job information 1808. Actual print data may be separately acquired via the N/W communication unit 308 based on detailed information (for example, a URL) or directly written in the NFC memory 312.

The license information 1805 indicates a state in which a software function is added via the smartphone 101 and function addition contents are written in the NFC memory 312 while the MFP 102 is in the power-off state. Note that a program necessary for actually adding a function may be directly written in the NFC memory 312 or separately acquired via the N/W communication unit 308. When, for example, the MFP 102 transits from the power-off state to the power-on state, software update is executed according to a software update reservation stored in the NFC memory 312.

Figure 19:
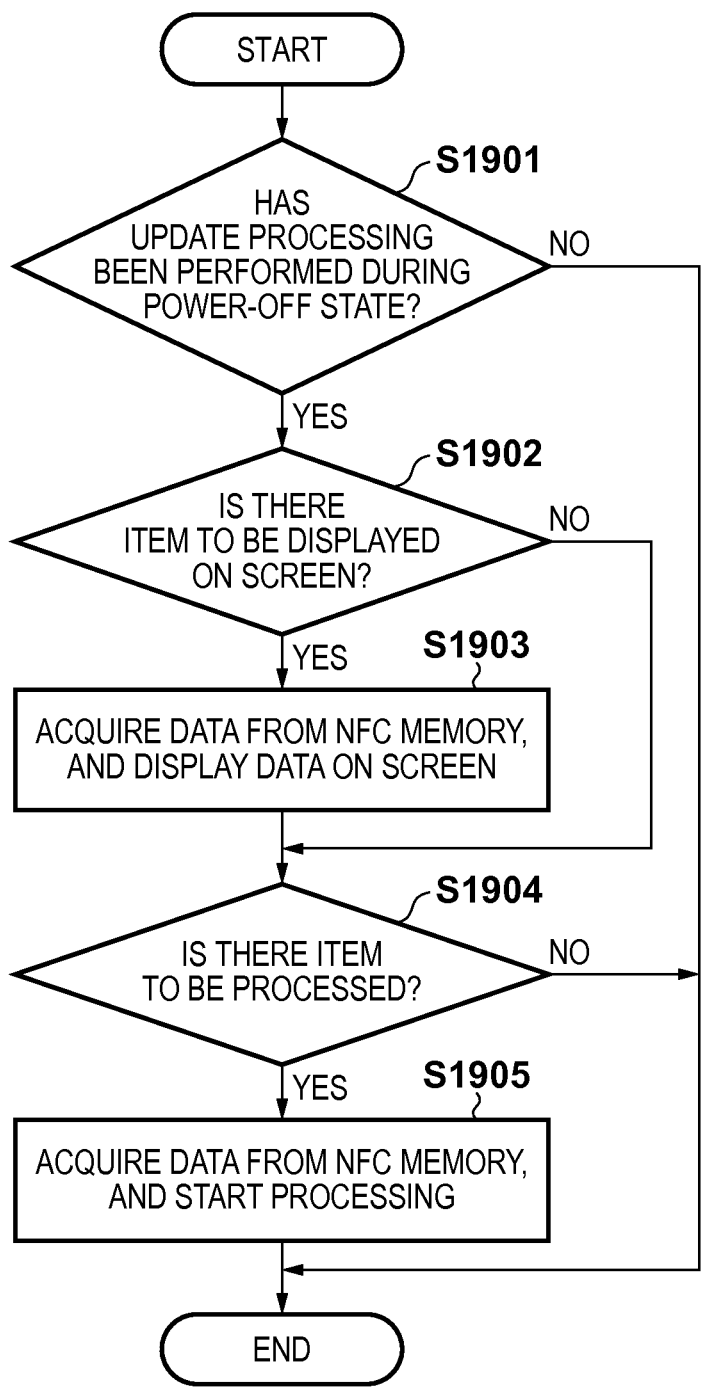
FIG. 19 is a flowchart illustrating processing when the MFP transits to the power-on state.

FIG. 19 is a flowchart illustrating processing when the MFP transits to the power-on state. A case in which the contents of the NFC memory 312 have been changed from the state shown in FIG. 17 to that shown in FIG. 18 during the power-off state of the MFP 102 will be exemplified.

When the MFP transits to the power-on state, in step S1901 the sequence control unit 1501 performs processing of determining whether the NFC memory 312 has been updated during the power-off state. Whether the NFC memory 312 has been updated may be determined by preparing an update check flag in the NFC memory 312 or by holding a copy in the storage device 306 to compare the contents. If it is determined that the NFC memory 312 has been updated (YES in step S1901), the process advances to step S1902.

In step S1902, the sequence control unit 1501 performs processing of determining whether it is necessary to display the updated contents on a screen for the purpose of notifying the user of them. If it is determined that it is necessary to display the updated contents on the screen for the purpose of notifying the user of them (YES in step S1902), the process advances to step S1903. On the other hand, if it is determined that it is not necessary to display the updates contents on the screen for the purpose of notifying the user of them (NO in step S1902), the process advances to step S1904.

In step S1903, the sequence control unit 1501 acquires data necessary for display from the NFC memory 312, and requests the display processing unit 1503 to execute screen display processing.

FIG. 20 is a view showing an example of the part replacement screen of the MFP. A part replacement screen 2001 is a screen displayed by the display processing unit 1503 in step S1903 described above when the maintenance information 1801 and part A use count 1802 of FIG. 18 are updated. In the part replacement screen 2001, a procedure when the part A has been replaced and the user wants to confirm details of the replacement operation is displayed. Note that the display processing unit 1503 displays the screen based on the information of the confirmation procedure 1807 appended to the part A use count.

In step S1904, the sequence control unit 1501 performs processing of determining whether it is necessary to process the updated contents in the NFC memory 312. If it is determined that it is necessary to process the updated contents in the NFC memory 312 (YES in step S1904), the process advances to step S1905; otherwise (NO in step S1904), the sequence ends.

In step S1905, the sequence control unit 1501 acquires data from the NFC memory 312, and starts corresponding processing. Note that the maintenance information management unit 1505 or the print request reception unit 1506 may execute actual processing. Upon completion of update processing, the display processing unit 1503 may display the screen.

Through the above steps, the sequence control unit 1501 acquires the data from the NFC memory 312 upon power-on, and reflects the data in the MFP 102, thereby terminating the sequence.

FIG. 21 is a view showing an example of the print request reception screen of the MFP. A print request reception screen 2101 is a screen for notifying that a print request (print output request information) written in the NFC memory 312 has been received during the power-off state. This allows the user to confirm that the print request reception unit 1506 has normally received the print request, and issued a reception number.

Similarly, upon power-on, the sequence control unit 1501 instructs the print request reception unit 1506 to acquire print data. This enables the MFP 102 to reduce unnecessary processing by starting print processing at the time of power-on.

FIG. 22 is a view showing an example of the software update screen of the MFP. A software update screen 2201 is a screen for notifying the user of function addition contents written in the NFC memory 312 during the power-off state. This allows the user to confirm that software update (upgrade) has been done, and its contents (addition of a BOX function in this example).

As described above, according to the second embodiment, even if the MFP 102 is in the power-off state, it is possible to preferably maintain the MFP 102 and send a print request to the MFP 102.

For example, when transiting from the power-on state to the power-off state, the MFP 102 writes device information including maintenance information in the NFC memory 312. This allows the user to confirm the maintenance information of the MFP 102 via the smartphone 101 even if the MFP 102 is in the power-off state, thereby maintaining the MFP 102. It is also possible to reflect a maintenance result in the MFP 102 by writing the maintenance result in the NFC memory 312.

Furthermore, for example, even if the MFP 102 is in the power-off state, it is possible to receive a print request from the user by storing the print request in the NFC memory 312. This makes it possible to preferentially process printing based on the print request upon power-on, thereby reducing unnecessary processing.

Third Embodiment

In the above-described first and second embodiments, the method of acquiring and updating the device information of the MFP 102 using the NFC memory 312 even during the power-off state, the maintenance method for the MFP 102, and the print processing have been explained. In the third embodiment, a print request to an MFP 102 will be described in detail.

FIG. 23 is a block diagram showing the schematic arrangement of functions executed by the MFP according to the third embodiment. Each function is implemented when a CPU 301 executes a program stored in a ROM 302. A sequence control unit 2301 manages control of the overall device including a power supply, and controls access to an NFC memory 312 via an NFC control unit 309. An input processing unit 2302 processes input information received by an operation unit 305. A display processing unit 2303 performs processing of outputting a display image to a display unit 304. A device control unit 2304 controls a print processing unit 307 and a storage device 306. A print request reception unit 2305 temporarily receives, via an N/W communication unit 308, print data to be processed by the print processing unit 307, and controls a processing order.

FIG. 24 is a table showing print setting information according to the third embodiment. Information about print processing to be written in the NFC memory 312 is registered in print setting information 2401 which is analyzed by the print request reception unit 2305. The print setting information 2401 is generally saved in the storage device 306, and can be changed by the user via the display unit 304 and the operation unit 305. The print setting information 2401 defines a method of writing information in the NFC memory 312 for each status of print processing in the MFP 102. The print setting information 2401 includes print data 2402 to be actually used for printing and thumbnail data 2403 for displaying an image of a print result on a display unit 208 or the like. The print setting information 2401 may be configured to define all parameters necessary for print processing in addition to the print data 2402 and the thumbnail data 2403, as a matter of course.

A print completion status 2404 indicates a state in which print processing is complete when the MFP 102 transits from the power-on state to the power-off state. In the print completion status 2404, the print data 2402 is held not in the NFC memory 312 but in a storage on a network. Similarly, in the print completion status 2404, the thumbnail data 2403 is held in neither the NFC memory 312 nor the storage on the network.

A print continuation status 2405 indicates a state in which print processing continues (the processing is in progress) when the MFP 102 transits from the power-on state to the power-off state. In the print continuation status 2405, the print data 2402 is held in the NFC memory 312 but is not held in the storage on the network. Similarly, in the print continuation status 2405, the thumbnail data 2403 is held in the NFC memory 312 but is not held in the storage on the network.

A print standby status 2406 indicates a state in which no print processing has been performed when the MFP 102 transits from the power-on state to the power-off state. In the print standby status 2406, the print data 2402 is held not in the NFC memory 312 but in the storage on the network. Similarly, in the print standby status 2406, the thumbnail data 2403 is held in the NFC memory 312 but is not held in the storage on the network.

As described above, data to be recorded in the NFC memory 312 when the MFP 102 transits from the power-on state to the power-off state is set in the print setting information 2401. In this example, assume that the MFP 102 transits from the power-on state to the power-off state. The present invention may be applied to a case in which the MFP changes its mode from the power-on mode to a power saving mode for power saving.

FIG. 25 is a view showing an example of print information in the NFC memory when print processing is written according to the third embodiment. In FIG. 25, information about print information 2501, print data 2502, and thumbnail data 2503 is written in the NFC memory 312.

The print information 2501 includes a reception date/time when a processing request is actually received, a reception number, a status, an end date/time (if processing is complete), reference information to the print data 2502 and thumbnail data 2503, and a printing method with respect to a print processing request to the MFP 102.

Since a print processing request 2504 having a reception number "000001" includes a status "print completion" and an end date/time, print processing for the print processing request 2504 is complete. The print processing request 2504 includes reference information to "PID_000001" of the print data 2502. Furthermore, print data 2510 indicated by "PID_000001" of the reference destination represents that its data format is "remote" and the print data 2510 exists at a location represented by "http://aaa.bbb.ccc/ddd/eee/f1" on the network. Similarly, print processing for a print processing request 2505 having a reception number "000002" is complete, and the print processing request 2505 includes reference information to "PID_000002" of the print data 2502.

The status of a print processing request 2506 having a reception number "000003" is "print in progress", which indicates that print processing has been interrupted midway. The print processing request 2506 includes reference information to "PID_000003" of the print data 2502 and "SID_000001" of the thumbnail data. Furthermore, print data 2511 indicated by "PID_000003" of the reference destination represents that its data format is "double-sided" and the print data 2511 exists both on the network and in the NFC memory 312. Actual data in the NFC memory 312 is indicated by "XXXXX ... " following "http://aaa.bbb.ccc/ddd/eee/f3" of the print data 2511. Thumbnail data 2513 indicated by "SID_000001" of the reference destination represents that its data format is "local" and the thumbnail data 2513 exists in the NFC memory 312. More specifically, "XXXXX ... " indicates actual data. Similarly, print processing for a print processing request 2507 having a reception number "000004" has been interrupted, and the print processing request 2507 includes reference information to "PID_000004" of the print data 2502 and "SID_000002" of the thumbnail data 2503.

The status of a print processing request 2508 having a reception number "000005" is "print standby", which indicates that print processing has not started. The print processing request 2508 includes reference information to "PID_000005" of the print data 2502 and "SID_000003" of the thumbnail data. Furthermore, print data 2512 indicated by "PID_000005" of the reference destination represents that its data format is "remote" and the print data 2512 exists at "http://aaa.bbb.ccc/ddd/eee/f5" on the network. Thumbnail data 2514 indicated by "SID_000003" of the reference destination represents that its data format is "remote" and the thumbnail data 2514 exists at "http://aaa.bbb.ccc/ddd/eee/s3" on the network. Similarly, print processing for a print processing request 2509 having a reception number "000006" has not started, and the print processing request 2509 includes reference information to "PID_000006" of the print data 2502 and "SID_000004" of the thumbnail data 2503.

The printing method of a print processing request 2506 having the reception number "000003" is "single-sided", which indicates that the printing method is single-sided printing. Similarly, the printing method of the print processing request 2508 having the reception number "000005" is "2in1", which indicates that layout printing has been set. Although single-sided/double-sided, layout printing, and binding are designated in this embodiment, the same applies to other settings about the printing method, such as page designation printing, sort processing, and paper designation. Although not described here, assume that an area to be used as a storage area on the network can also be set.

Figure 26:
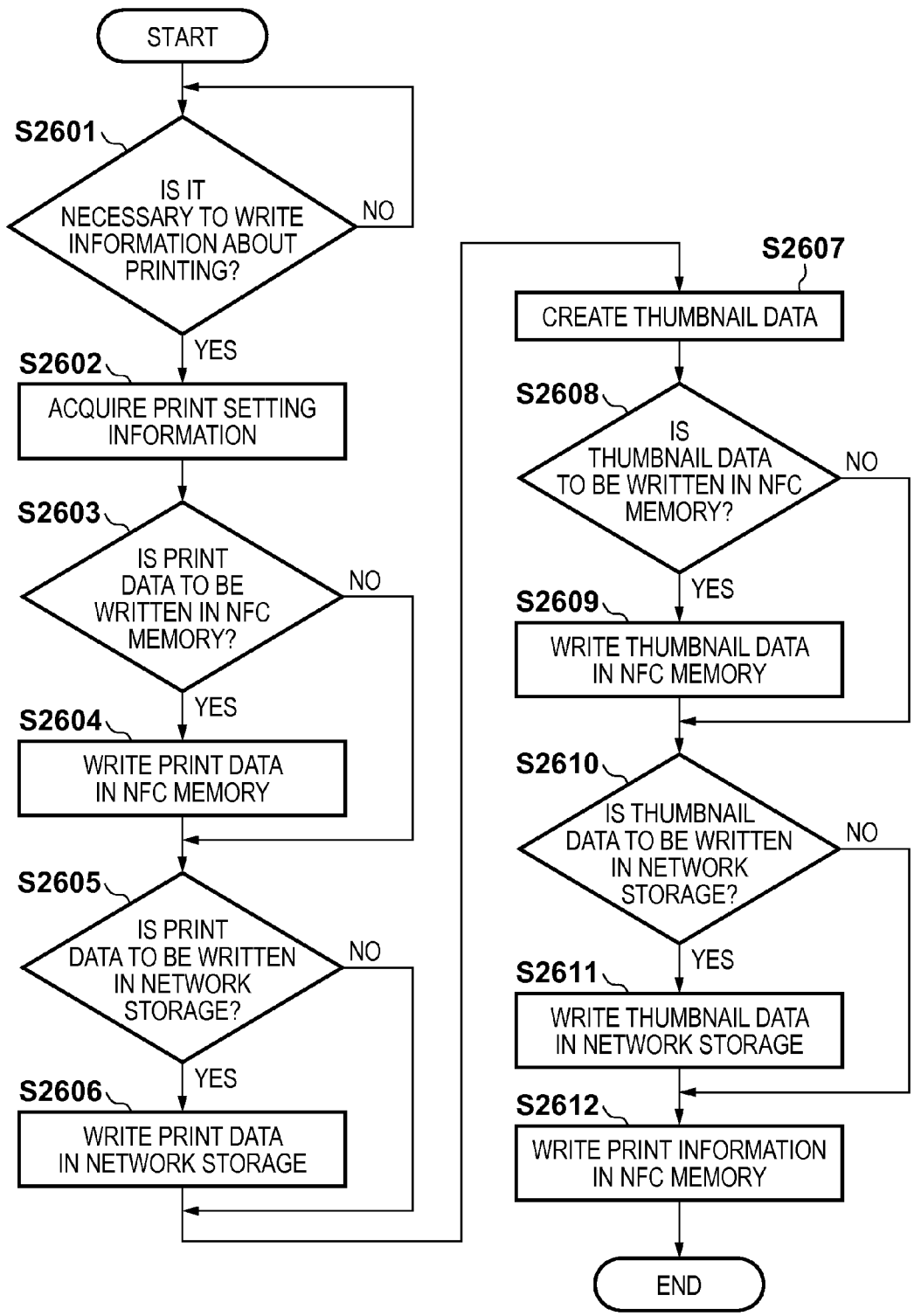
FIG. 26 is a flowchart illustrating processing in which the MFP writes print information according to the third embodiment.

FIG. 26 is a flowchart illustrating processing in which the MFP writes print information according to the third embodiment. More specifically, FIG. 26 shows a sequence of writing the print information 2501, the print data 2502, and the thumbnail data 2503 in the NFC memory 312 while the MFP 102 is in the power-on state.

The sequence control unit 2301 performs processing of standing by until it becomes necessary to write information about printing in the power-on state (step S2601). More specifically, when the print request reception unit 2305 detects a change in status of printing, it is determined that it is necessary to write information about printing.

If it is necessary to write information about printing (YES in step S2601), the print request reception unit 2305 performs processing of acquiring the print setting information 2401, and analyzing the contents. For the print setting information 2401 of FIG. 24, for example, a method of writing print data and thumbnail data is instructed according to the status of a print processing request. More specifically, print data for which printing is complete is written not in the NFC memory 312 but in the storage area on the network, and thumbnail data for which printing is complete is not written at all. Similarly, print data for which printing has been interrupted midway is written in both the NFC memory 312 and the storage on the network. Furthermore, thumbnail data related to print processing which has been interrupted in the middle of printing is written in the NFC memory 312 but is not written in the storage on the network.

For a received print processing request, the print request reception unit 2305 performs processing of determining whether it is necessary to write the print data 2502 in the NFC memory 312 (step S2603). If it is determined that it is necessary to write the print data 2502 in the NFC memory 312 (YES in step S2603), the print request reception unit 2305 performs processing of writing the print data 2502 in the NFC memory 312 (step S2604). On the other hand, if it is determined that it is not necessary to write the print data 2502 in the NFC memory 312 (NO in step S2603), the print request reception unit 2305 performs processing of determining whether it is necessary to write the print data 2502 in the storage area on the network (step S2605).

If it is determined that it is necessary write the print data 2502 in the storage area on the network (YES in step S2605), the print request reception unit 2305 performs processing of writing the print data 2502 in the storage area on the network (step S2606). Furthermore, the print request reception unit 2305 writes, in the NFC memory 312, information indicating a location on the network where the print data has been written. The information of the location on the network need only be information for specifying a location such as a URL.

If information such as login information necessary for access also exists, the information may be written together.

If it is determined that it is not necessary to write the print data 2502 in the storage area on the network (NO in step S2605), the print request reception unit 2305 performs processing of creating the thumbnail data 2503 to be displayed on the display unit 208 (step S2607).

For the received print processing request, the print request reception unit 2305 performs processing of determining whether it is necessary to write the thumbnail data 2503 in the NFC memory 312 (step S2608).

If the thumbnail data 2503 is to be written in the NFC memory 312 (YES in step S2608), the print request reception unit 2305 performs processing of writing the thumbnail data 2503 in the NFC memory 312 (step S2609).

On the other hand, if the thumbnail data 2503 is not to be written in the NFC memory 312 (NO in step S2608), the print request reception unit 2305 performs processing of determining whether it is necessary to write the thumbnail data 2503 in the storage area on the network (step S2610).

If it is determined that it is necessary to write the thumbnail data 2503 in the storage area on the network (YES in step S2610), the print request reception unit 2305 performs processing of writing the thumbnail data 2503 in the storage area on the network (step S2611). Furthermore, the print request reception unit 2305 writes, in the NFC memory 312, information indicating a location on the network where the thumbnail data has been written. The information of the location on the network need only be information for specifying a location such as a URL. If information such as login information necessary for access also exists, the information may be written together.

If it is determined that it is not necessary to write the thumbnail data 2503 in the storage area on the network (NO in step S2610), the print request reception unit 2305 performs processing of writing the print information 2501 in the NFC memory 312 (step S2612).

Upon completion of writing of the print information 2501, the print data 2502, and the thumbnail data 2503 in the NFC memory 312 through the above steps, the sequence control unit 2301 terminates the sequence.

Figure 27:
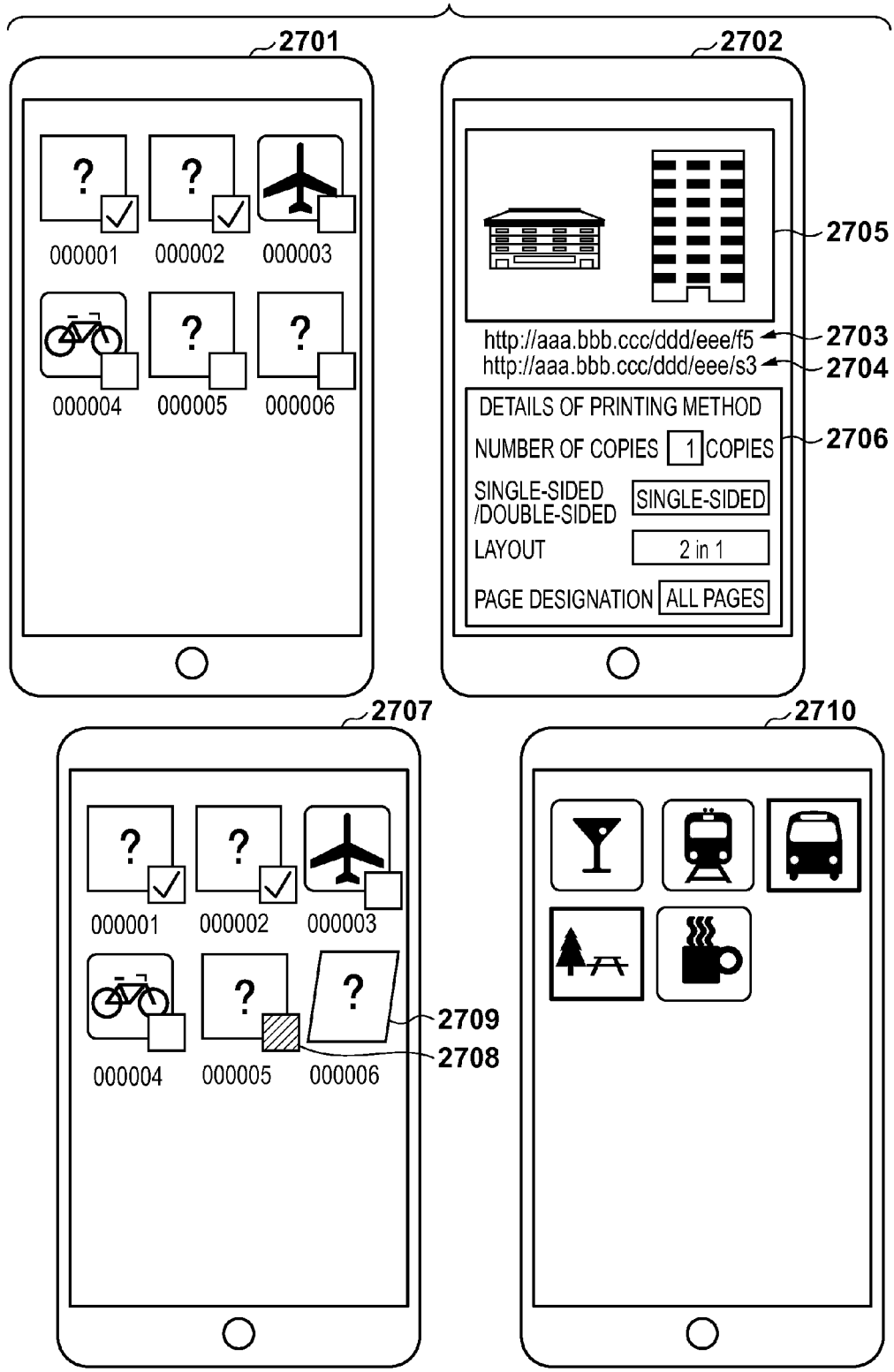
FIG. 27 is a view showing an example of the screen of a smartphone according to the third embodiment.

FIG. 27 is a view showing an example of the screen of a smartphone according to third embodiment. A UI screen 2701 is a screen when a smartphone 101 is used to acquire the print information 2501 from the MFP 102 in the power-off state. The UI screen 2701 displays a print processing request status, and also displays icons and reception numbers. The icons of the reception numbers "000001" and "000002" are checked, which indicates that printing is complete. For the icons of the reception numbers "000003" and "000004", the thumbnail data 2503 acquired via the print information 2501 are displayed, thereby allowing the user to recognize the print data 2502 for which printing is not complete. On the other hand, the icons of the reception numbers "000005" and "000006" include no thumbnail data 2503 acquired via the print information 2501, thereby disabling the user from recognizing the print data 2502 for which printing is not complete.

A UI screen 2702 is a screen obtained when the user touches the icon of the reception number "000005" on the UI screen 2701.

The UI screen indicates that print data exist in a storage area on the network, which is designated by a URL 2703. Similarly, the UI screen indicates that thumbnail data exists in a storage area on the network, which is designated by a URL 2704. Furthermore, thumbnail data on the network is acquired, and a preview display 2705 of an image of a print result is displayed on the UI screen 2702. A detailed display 2706 of the printing method is displayed, which indicates that the number of copies is 1, single-sided printing and 2in1 are set, and all pages are to be printed.

The user can edit the print information 2501 through the detailed display 2706 of the printing method in the UI screen 2702. After editing, the smartphone 101 can write the data in the NFC memory 312 of the MFP 102 via NFC communication 103. For example, it is possible to change the number of copies from "1" to "2". That is, the smartphone 101 changes the printing method in advance by writing the data in the NFC memory 312 even if the MFP 102 is in the power-off state, and the MFP 102 performs print processing according to the contents of the NFC memory 312 upon power-on. As described above, it is possible to change the printing method using the smartphone 101.

A UI screen 2707 is a screen indicating a state in which the printing method of the reception number "000005" has been changed in the UI screen 2701 and the print processing of the reception number "000006" has been canceled. More specifically, the number of copies of the reception number "000005" has been changed from "1" to "2" in the UI screen 2702. In the UI screen 2707, displaying a black marker 2708 on an icon indicates that print processing corresponding to the icon has been changed.

In the UI screen 2707, tilting and displaying an icon 2709 represents that print processing corresponding to the icon has been canceled. After receiving cancellation designation from the user, the smartphone 101 writes the cancellation designation in the NFC memory 312 of the MFP 102 via the NFC communication 103. Therefore, by writing a cancellation instruction in the NFC memory 312 even if the MFP 102 is in the power-off state, the MFP 102 can cancel print processing according to the contents of the NFC memory 312 upon power-on.

A UI screen 2710 is a screen for newly requesting print processing. In this example, assume that one of a plurality of print processes is selected and requested.

The smartphone 101 can newly add print processing itself using the UI screen 2710, and write the print processing itself in the NFC memory 312 of the MFP 102 via the NFC communication 103. That is, the smartphone 101 writes a print instruction in the NFC memory 312 even if the MFP 102 is in the power-off state, and then the MFP 102 starts the print processing according to the contents of the NFC memory 312 upon power-on.

FIGS. 28A and 28B are a view showing an example of the NFC memory edited by the smartphone according to the third embodiment. Memory contents 2800a are written in the NFC memory 312 by the smartphone 101 while the power supply of the MFP 102 is OFF, and include print information 2801, print data 2802, and thumbnail data 2803. In this example, the print information 2501 written in the NFC memory 312 in the state of the UI screen 2707 will be exemplified. More specifically, with respect to the print information 2501 of FIG. 25, the number of copies of the reception number "000005" has been changed from "1" to "2", and a cancel request has been issued for the reception number "000006".

In the print information 2801, print data 2802, and thumbnail data 2803, data for which printing is complete are omitted. The number of copies of the printing method of print information 2804 having the reception number "000005" has been changed to "2". The status of print information 2805 having the reception number "000006" has been changed to "cancel", and print data 2806 indicated by "PID_000006" and thumbnail data 2807 indicated by "SID_000004" have been deleted.

Memory contents 2800b are written in the NFC memory 312 by the smartphone 101 while the power supply of the MFP 102 is OFF, and include print information 2808, print data 2809, and thumbnail data 2810. The print information 2501 written in the NFC memory 312 in the state of the UI screen 2710 in which new print processing has been added will be exemplified.

In the print information 2808, print data 2809, and thumbnail data 2810, data for which printing is complete are omitted. The status of print information 2811 added first is "new", which indicates that print processing has been newly submitted. The print information 2811 includes reference information to "PID_000007" of the print data 2809 and "SID_000005" of the thumbnail data 2810. Furthermore, print data 2813 indicated by "PID_000007" of the reference destination represents that its data format is "remote" and the print data 2813 exists at "http://aaa.bbb.ccc/ddd/eee/f7" on the network. Thumbnail data 2815 indicated by "SID_000005" of the reference destination represents that no actual data itself exists. Similarly, the status of a print processing request 2812 added second is "new", which indicates that print processing has been newly submitted. The print processing request 2812 includes reference information to "PID_000008" of the print data 2809 and "SID_000002" of the thumbnail data 2810. Furthermore, the print data 2813 indicated by "PID_000008" of the reference destination represents that its data format is "local" and the print data 2813 exists as "XXXXX . . . " in the NFC memory 312. Furthermore, thumbnail data 2816 indicated by "SID_000006" of the reference destination represents that no actual data itself exists.

FIG. 29 is a block diagram showing the schematic arrangement of functions executed by the smartphone according to the third embodiment. Each function is implemented when a CPU 201 executes a program stored in a ROM 202. A sequence control unit 2901 controls the smartphone 101 to communicably connect to the MFP 102 by the NFC communication 103 via an NFC communication unit 206 including an NFC chip (an IC chip complying with the NFC communication standard), thereby controlling data transmission/reception. An input processing unit 2902 processes input information received by an operation unit 207. A display processing unit 2903 performs processing of outputting a display image to the display unit 208. A print request unit 2904 determines contents to be written in the NFC memory 312 of the MFP 102 via the NFC communication unit 206.

Figure 30:
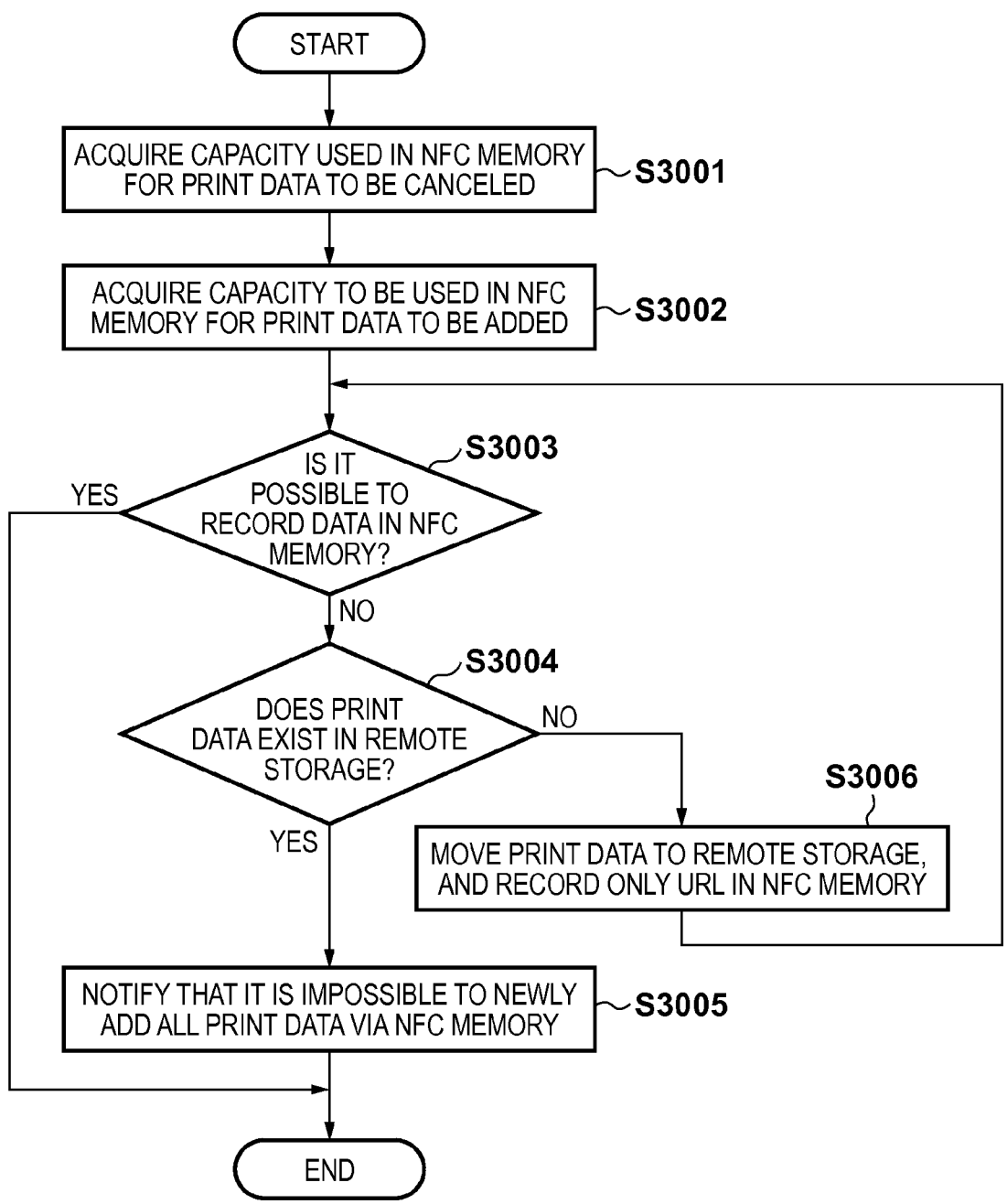
FIG. 30 is a flowchart illustrating processing when the smartphone decides print information according to the third embodiment.

FIG. 30 is a flowchart illustrating processing when the smartphone decides print information according to the third embodiment. More specifically, FIG. 30 shows a sequence in which the smartphone 101 decides the print information 2501 to be written in the NFC memory 312. When the smartphone 101 decides a print processing request to the NFC memory 312 of the MFP 102, the process starts. The process starts when, for example, the smartphone decides cancellation of print processing, addition of print processing, or edited contents.

To cancel print processing in the MFP 102, the print request unit 2904 performs processing of acquiring a capacity used in the NFC memory 312 (step S3001). The capacity used in the NFC memory 312 is actually acquired when data is acquired from the NFC memory 312 for the first time.

To add print processing, the print request unit 2904 performs processing of acquiring a capacity to be used in the NFC memory 312 (step S3002).

Based on an available capacity which changes due to cancellation and addition of print processing, the print request unit 2904 performs processing of determining whether it is possible to record contents changed by the smartphone 101 in the NFC memory 312 (step S3003).

If it is determined that it is possible to record the contents changed by the smartphone 101 in the NFC memory 312 (step S3003), the sequence ends.

If it is impossible to record the contents changed by the smartphone 101 in the NFC memory 312 (step S3003), the print request unit 2904 performs processing of determining whether it has been designated to record print data in the remote storage on the network (step S3004).

If it is determined that it has been designated to record the print data in the remote storage on the network (YES in step S3004), the print request unit 2904 performs processing of notifying that it is impossible to update all print processes via the NFC memory 312 (step S3005). More specifically, the display processing unit 2903 notifies the user of contents which can be updated and contents which cannot be updated. The user may be able to change the contents to be updated, as a matter of course.

If it is determined that it has not been designated to record the print data in the remote storage on the network (NO in step S3004), the print request unit 2904 changes the setting to designate the remote storage on the network for the print data designated in the print information 2501. More specifically, the print data is moved to the storage on the network, and information (URL or the like) indicating the location is recorded in the print information 2501.

As described above, based on the available capacity of the NFC memory 312, the print request unit 2904 determines whether to record the print data in the NFC memory 312 or the remote storage on the network. This makes it possible to request print processing as much as possible even if the available capacity of the NFC memory 312 is insufficient. Although whether to directly write the print data in the NFC memory 312 is determined based on the available capacity in this example, such determination may be performed by user designation or performed based on the state of the MFP 102 or the state of the smartphone 101.

Figure 31:
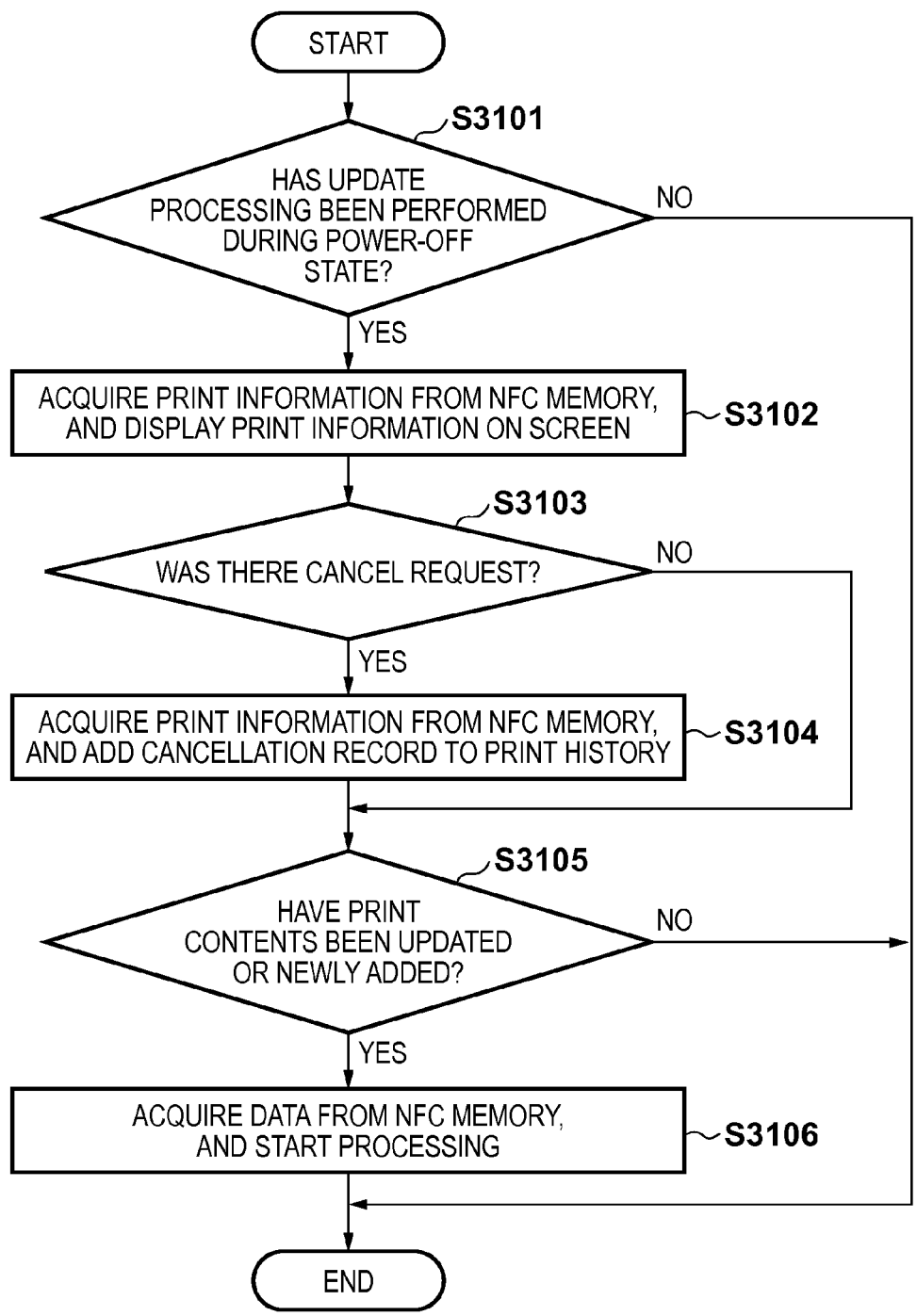
FIG. 31 is a flowchart illustrating processing when the MFP is powered on according to the third embodiment.

FIG. 31 is a flowchart illustrating processing when the MFP is powered on according to the third embodiment. More specifically, FIG. 31 shows a sequence executed when the MFP 102 transits from the power-off state to the power-on state.

Upon power-on, the sequence control unit 2301 performs processing of determining whether the NFC memory 312 has been updated during the power-off state (step S3101). Whether the NFC memory 312 has been updated may be determined by preparing a flag in the NFC memory 312 or by holding a copy in the storage device 306 to compare the contents.

The sequence control unit 2301 acquires data necessary for display from the NFC memory 312, and requests the display processing unit 2303 to execute screen display processing (step S3102).

The print request reception unit 2305 performs processing of determining whether there was a cancel request among print processing requests (step S3103).

If it is determined that there was a cancel request (YES in step S3103), the print request reception unit 2305 performs processing of acquiring the print information 2501 from the NFC memory 312, and adding a cancellation record to a print history (step S3104). The print history exists in the storage device 306 of the MFP 102, in which a list of print results can be confirmed via the display unit 304 even after power-off. The print history may be confirmed on the RAM 303 without being saved in the storage device 306.

If it is determined that there was no cancel request (NO in step S3103), the print request reception unit 2305 performs processing of determining whether a print processing request has been updated or newly added (step S3105).

If it is determined that a print processing request has been updated or newly added (YES in step S3105), the print request reception unit 2305 acquires the print information 2501 from the NFC memory 312, and starts processing with updated contents or added contents (step S3106).

If it is determined that no print processing request has been updated or newly added (NO in step S3105), the sequence ends.

FIG. 32 is a view showing an example of the print request reception screen of the MFP according to the third embodiment. More specifically, a print request reception screen 3201 indicates that contents of print requests that have been written in the NFC memory 312 via the smartphone 101 during the power-off state are being processed. The print request reception screen 3201 indicates that the print request reception unit 2305 has normally received a print request, and issued a reception number. Similarly, upon power-on, the sequence control unit 2301 instructs the print request reception unit 2305 to acquire print data. With this processing, the MFP 102 can eliminate unnecessary processing by starting print processing at the time of power-on.

Furthermore, the print request reception screen 3201 indicates that the printing method of the reception number "000005" has been changed and its number of copies has been changed from "1" to "2". The print request reception screen 3201 also indicates that the print processing itself of the reception number "000006" has been canceled.

As described above, according to the third embodiment, it is possible to store print requests even in the power-off state by storing contents of print requests in the NFC memory 312 during the power-off state of the MFP 102. It is also possible to change, add, or cancel a printing method by rewriting the NFC memory 312 during the power-off state. This allows processing equivalent to that in the power-on state to be executed even if the power supply of the MFP 102 is OFF. Printing can be continuously processed when the MFP 102 is powered on, thereby eliminating unnecessary processing.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137471, filed Jun. 28, 2013, and No. 2014-095512, filed May 2, 2014, which are hereby incorporated by reference herein in their entirety.

What is claimed is:

1. An electronic device comprising:
a first communication unit configured to perform short distance wireless communication with an external device for performing a read or write operation on a first storage unit with information for acquiring print data by the external device even when said electronic device is in a power-off state, wherein the first communication unit operates in a card emulation mode for communicating with the external device that operates in a reader/writer mode;
a second communication unit configured to acquire print data;
a printing unit configured to print the print data acquired by said second communication unit; and
a control unit configured to control said second communication unit to acquire the print data in accordance with the information for acquiring the print data and said printing unit to print the print data acquired by said second communication unit when said electronic device transits from a power-off state to a power-on state and the information for acquiring the print data has been written in the first storage unit by the external device via said first communication unit during the power-off state, wherein at least one of the units is implemented by a CPU executing computer-executable code stored in a non-transitory computer-readable memory.

2. The electronic device according to claim 1, further comprising:
a management unit configured to manage device information of said electronic device by storing the device information in a second storage unit different from the first storage unit, and
a storage control unit configured to control, when said electronic device transits from the power-on state to the power-off state, to write at least part of the device information stored in the second storage unit to the first storage unit, wherein
said storage control unit controls to update the device information stored in the second storage unit with the device information stored in the first storage unit when said electronic device transits from the power-off state to the power-on state.

3. The electronic device according to claim 2, further comprising a notification unit configured to notify, when the device information stored in the first storage is updated, a user of information about the update operation.

4. The electronic device according to claim 2, further comprising a receiver configured to receive from a user an instruction indicating whether to allow update of the device information stored in the second storage unit by said storage control unit.

5. The electronic device according to claim 2, wherein said storage control unit writes, in the first storage unit, items designated in advance among a plurality of items included in the device information stored in the second storage unit when said electronic device transits from the power-on state to the power-off state.

6. The electronic device according to claim 2, wherein
said management unit is configured to set a priority for each item included in the device information stored in the second storage unit, and
said storage control unit writes in the first storage unit an item having a relatively high priority among a plurality of items included in the device information stored in the second storage unit when said electronic device transits from the power-on state to the power-off state.

7. The electronic device according to claim 2, wherein the device information stored in the second storage unit includes at least one of information about function settings of said electronic device, information about an operation history of said electronic device, and information about a state of a consumable item used in said electronic device.

8. The electronic device according to claim 1, further comprising
an update unit configured to update software for implementing a function of said electronic device, wherein
said update unit executes update processing according to a software update reservation stored in the first storage unit when said electronic device transits from the power-off state to the power-on state.

9. A non-transitory computer-readable storage medium storing a program that when executed causes a computer to function as each unit of said electronic device according to claim 1.

10. The electronic device according to claim 1, wherein the information for acquiring the print data is information indicating a storage area in which the print data is stored.

11. The electronic device according to claim 1, wherein the information for acquiring the print data is specified by a Uniform Resource Locator (URL).

12. The electronic device according to claim 1, wherein the power-off state includes a power saving state which has lower consuming power compared to the power-on state.

13. The electronic device according to claim 1, further comprising a display controller configured to control a display device so as to display, when said electronic device transits from the power-off state to the power-on state and a print request has been written in the first storage unit by the external device via said first communication unit during in the power-off state, information which indicates that a print requested by the print request is performed.

14. A control method for an electronic device comprising:
performing short distance wireless communication with an external device for performing a read or write operation on a first storage unit with information for acquiring print data by the external device even when said electronic device is in a power-off state, wherein said electronic device operates in a card emulation mode for communicating with the external device that operates in a reader/writer mode;
acquiring print data;
printing the acquired print data; and
controlling to acquire the print data in accordance with the information for acquiring the print data and to print the acquired print data when said electronic device transits from a power-off state to a power-on state and the information for acquiring the print data has been written in the first storage unit by the external device during the power-off state.

15. An information processing system comprising an electronic device and an external device, said electronic device comprising:
a first communication unit configured to perform short distance wireless communication with an external device for performing a read or write operation on a first storage unit with information for acquiring print data by the external device even when the electronic device is in a power-off state, wherein the first communication unit operates in a card emulation mode for communicating with the external device that operates in a reader/writer more;
a second communication unit configured to acquire print data;
a printing unit configured to print the print data acquired by said second communication unit; and
a control unit configured to control said second communication unit to acquire the print data in accordance with the information for acquiring the print data and said printing unit to print the print data acquired by said second communication unit when the electronic device transits from a power-off state to a power-on state and the information for acquiring the print data has been written in the first storage unit by the external device via said first communication unit during the power-off state, wherein at least one of the units is implemented by a CPU executing computer-executable code stored in a non-transitory computer-readable memory.

* * * * *